US012461069B2

(12) United States Patent
Pantha et al.

(10) Patent No.: US 12,461,069 B2
(45) Date of Patent: Nov. 4, 2025

(54) SYSTEMS AND METHODS FOR ESTIMATING CONCRETE STRENGTH USING SURFACE WAVE SPEED

(71) Applicant: PREDICTANT LLC, Raleigh, NC (US)

(72) Inventors: Tej N. Pantha, Raleigh, NC (US); Armita Mohammadian, Raleigh, NC (US); Shawn G. Anderson, Raleigh, NC (US); Klarissa Ramos, Raleigh, NC (US); Ethan Loewenthal, Durham, NC (US); Joshua Scott, Raleigh, NC (US); Ashtad Javanmardi, Raleigh, NC (US); Akash Nikam, Knightdale, NC (US)

(73) Assignee: Predictant LLC, Raleigh, NC (US)

( * ) Notice: Subject to any disclaimer, the term of this patent is extended or adjusted under 35 U.S.C. 154(b) by 328 days.

(21) Appl. No.: 17/531,515

(22) Filed: Nov. 19, 2021

(65) Prior Publication Data

US 2023/0160855 A1    May 25, 2023

(51) Int. Cl.
| | |
|---|---|
| G01N 29/07 | (2006.01) |
| G01N 29/24 | (2006.01) |
| G01N 29/44 | (2006.01) |
| G01N 33/38 | (2006.01) |
| G06N 20/00 | (2019.01) |

(52) U.S. Cl.
CPC ......... G01N 29/07 (2013.01); G01N 29/2462 (2013.01); G01N 29/44 (2013.01);
(Continued)

(58) Field of Classification Search
CPC .. G01N 29/07; G01N 29/44; G01N 2291/011; G01N 2291/0232;
(Continued)

(56) References Cited

U.S. PATENT DOCUMENTS

| | | | |
|---|---|---|---|
| 10,436,767 B2 * | 10/2019 | Bellotti | ................. G01N 29/07 |
| 2004/0182627 A1 | 9/2004 | Bujak | |

(Continued)

FOREIGN PATENT DOCUMENTS

| | | | |
|---|---|---|---|
| JP | 2004150945 A | * | 5/2004 |
| JP | 2010169494 A | * | 8/2010 |

(Continued)

OTHER PUBLICATIONS

Definition/Article on phase velocity, downloaded Nov. 1, 24 (Year: 2024).*

(Continued)

*Primary Examiner* — Jacques M Saint Surin
(74) *Attorney, Agent, or Firm* — McAndrews, Held & Malloy, Ltd.; Michael S. Tomsa

(57) ABSTRACT

The present disclosure provides systems and methods for estimating the strength of a concrete foundation. The disclosed systems and methods can be used to estimate compressive strength of below-grade concrete without excavation. A method of estimating compressive strength may include determining compressive strength measurements corresponding to surface wave speeds for a plurality of concrete test specimens, determining a speed of surface waves in the concrete foundation, and estimating compressive strength of the concrete foundation based on the compressive strength measurements and corresponding surface wave speeds for the plurality of concrete test specimens and the speed of surface waves in the concrete foundation.

26 Claims, 18 Drawing Sheets

(52) U.S. Cl.
CPC ....... *G01N 29/4418* (2013.01); *G01N 33/383* (2013.01); *G06N 20/00* (2019.01); *G01N 2291/011* (2013.01); *G01N 2291/0232* (2013.01); *G01N 2291/02827* (2013.01); *G01N 2291/0423* (2013.01)

(58) Field of Classification Search
CPC .......... G01N 2291/028727; G01N 2291/0423; G01N 29/2462; G01N 29/4418; G01N 33/383; G06N 20/00
USPC .......................................................... 73/597
See application file for complete search history.

(56) References Cited

U.S. PATENT DOCUMENTS

| | | |
|---|---|---|
| 2013/0091952 A1 | 4/2013 | Kim et al. |
| 2015/0285058 A1 | 10/2015 | Gao et al. |

FOREIGN PATENT DOCUMENTS

| | | | |
|---|---|---|---|
| KR | 20120060270 A | * | 6/2012 |
| WO | 9524658 | | 9/1995 |

OTHER PUBLICATIONS

J. Darrin Holt, et al., "Determining Lengths of Installed Timber Piles by Dispersive Wave Propagation," Transportation Research Record 1447, p. 110-115.

Observational Seismology—Lecture 4, Surface Waves and Dispersion, GNH7/GG09/GEOL4002 Earthquake Seismology and Earthquake Hazard.

Yee Yan Lim, et al, "Parametric study and modeling of PZT based wave propagation technique related to practical issues in monitoring of concrete curing," Construction and Building Materials 176, p. 519-530 (2018).

Young Hak Lee, et al., "The Measurement of P-, S-, and R-Wave Velocities to Evaluate the Condition of Reinforced and Prestressed Concrete Slabs," Advances in Materials Science and Engineering, vol. 2016, Article ID 1548215, 14 pages.

Surface Wave Methods | Environmental Geophysics | US EPA, https://archive.epa.gov/esd/archive-geophysics/web/html/surface_wave_methods.html, Pulled Nov. 19, 2021.

Surface Wave Survey Method, http://www.masw.com/SurfaceWaveSurvey.html, Pulled Nov. 19, 2021.

Bagio, et al., Dec. 30, 2017. "Optimum concrete compression strength using bio-enzyme." MATEC Web of Conferences. 138. 01013. 10.1051/matecconf/201713801013 (5 pages).

Park et al. "Prediction of Concrete Strength with P-, S-, R-Wave Velocities by Support Vector Machine (SVM) and Artificial Neural Network (ANN)." Applied Sciences 9, 4053, Sep. 2019: n. pag (18 pages).

Yoon et al., "Evaluation of Early-Age Concrete Compressive Strength with Ultrasonic Sensors" Sensors 17, Aug. 7, 2017, No. 8: 1817. https://doi.org/10.3390/s17081817 (15 pages).

International Search Report and Written Opinion regarding PCT Application No. PCT/US22/50307, dated Mar. 1, 2023, 59 pages.

* cited by examiner

SYSTEMS AND METHODS FOR ESTIMATING CONCRETE STRENGTH USING SURFACE WAVE SPEED

FIELD

The present disclosure generally relates to systems and methods for evaluating the integrity of concrete using surface wave speed measurements.

BACKGROUND

Concrete structures often include both above- and below-grade portions. The above-grade portion is exposed above the surface of the ground (i.e., exposed concrete), while the below-grade portion is buried beneath the surface of the ground (i.e., buried concrete). The exposed concrete is referred to as a pier or a pedestal, or less commonly, as a column. The buried concrete is referred to as a pad, a footing, a foundation, or an anchor block. Concrete structures having both above- and below-grade portions are used in many industries and applications, including to support structures such as cellular telephone towers, transmission line towers, and wind turbines, to name a few.

In many circumstances, it is desirable to determine or estimate the compressive strength of the above- and below-grade portions of such concrete structures. This will help to evaluate, for example, the expected useful life of the concrete structure, whether the concrete structure is suitable for new, updated, or adapted uses, and/or whether the concrete needs to be replaced.

For example, when concrete structures are erected, the concrete comprising the above- and below-grade portions is ideally from the same batch, using the same mixture and having the same setting rate. But concrete is not always homogenously poured and sometimes multiple batches are used. When multiple batches are used, the strength at various points in a concrete structure can have different characteristics, including different compressive strengths. The lack of homogeneity can lead to cracks and weaknesses in one or both of the concrete portions due to factors such as weather conditions, shifting of the Earth, and vibrations from heavy machinery. As a result, structures supported by the concrete portions may shift or sway, may become unstable, or worse, may fall down or collapse. Above- and below-grade concrete portions are also exposed to different environments. Over time, this can result in a difference of concrete quality in the above- and below-grade portions.

There are some ways to test the compressive strength of concrete, but each is inefficient and has drawbacks. Core-sampling is one such way, which entails cutting a portion of the concrete structure into cylindrical samples and testing the samples to determine, among other characteristics, compressive strength. The testing is typically done offsite and/or in a laboratory environment. While this method may produce accurate results, it is expensive, time-consuming, and impractical for high-volume projects requiring testing of a large number of concrete structures. In particular, the results from core sampling cannot be obtained in real-time.

Two other methods to test the compressive strength of concrete include a penetration test and a rebound test. A penetration test can be performed with a Windsor Probe. One or more probes, typically made of a hardened steel alloy, are fired into the concrete in a perpendicular direction. Once the probes are fired and embedded in the concrete, the lengths of the probes projecting from the concrete are measured. The depth of penetration from each probe can then be correlated with compressive strength of the concrete at the test sites. The other test, a rebound test, can be performed with a Schmidt Hammer. This test entails measuring the distance of rebound that a spring-loaded mass exhibits relative to the surface of the concrete. The distance of the rebound depends on the elastic recovery of the concrete surface, which in turn is related to the hardness and compressive strength of the concrete.

However, when the concrete portion to be tested is buried beneath the surface of the ground, the above-methods suffer from numerous downsides. For one, each requires excavating around the concrete structure to expose the buried concrete portion, which can lie several feet or more below the surface of the ground. Excavation requires manual labor and/or the use of heavy machinery, both of which are expensive, labor-intensive, time-consuming, and potentially dangerous. Excavation is also not always practical or possible. When a concrete structure to be tested is located on a mountain or a hill, it may be difficult or impossible to transport the excavating machinery to the structure. When a concrete structure is located in a rocky area, it may be challenging to excavate in such areas to expose the concrete. Furthermore, core-sampling and penetration tests damage the concrete at each test location, which must be repaired after the tests are performed.

Another downside with current methods is the risk that while excavating, underground utilities may be inadvertently struck, causing disruption to nearby residents and businesses. Structures supported by the concrete to be excavated, such as cellular telephone towers, often have to be shut down during the excavation, also resulting in service disruptions. Once the excavation is complete and the buried concrete portion is exposed, core-sampling requires further time and costs to conduct the off-site tests.

A better and more efficient way of estimating the compressive strength of concrete without the drawbacks of current methods is therefore needed.

SUMMARY

The present disclosure provides systems and methods for using surface wave speed to estimate the compressive strength of concrete, including for both above- and below-grade portions of a concrete structure. The advantages and benefits gained by the systems and methods of this disclosure are numerous. One major advantage is that the compressive strength of below-grade concrete can be estimated without excavation. As explained in detail herein, instead of excavating around below-grade concrete, the systems and methods use rods that are driven through the earth and into contact with the below-grade concrete to perform testing. By not excavating, there is little to no need for taxing manual labor or the use of heavy machinery, which not only saves significant costs and time to perform the measurements, but are also much safer. Further, because excavation is not needed, the inventive systems and methods can be applied to below-grade concrete in any location or terrain. Yet another advantage of not excavating is that potential service disruptions are minimized or eliminated altogether.

Another major advantage of the disclosed systems and methods is the rapidity at which compressive strength measurements can be obtained, making it the only known way in the industry to quickly and accurately estimate compressive strength for high volume projects (e.g., wind farms). For example, compressive strength measurements can be obtained in real-time, unlike with core-sampling, and with comparable accuracy of predictions. These are only a few of the benefits and advantages gained from the inventive systems and methods. Others will become apparent to a person of ordinary skill in the art reading this disclosure and/or by applying the teachings herein.

Generally, the invention involves measuring the speed of surface waves on concrete and estimating a compressive strength therefrom. Surface waves are a type of mechanical wave that can be imparted onto a concrete structure, such as by striking the concrete (which also generates longitudinal (compressive) waves and transverse waves in the concrete). While not wishing to be bound by theory, it is believed that there is a strong correlation between surface wave speed and concrete strength. Data relating to the speed of surface waves for a concrete structure can be collected using the systems and methods disclosed herein. The data can be analyzed, such as by using regression analysis or machine learning algorithms, to estimate the compressive strength of the concrete.

In a first aspect, a method for estimating compressive strength of a concrete foundation is provided. The method includes determining compressive strength measurements corresponding to surface wave speeds for a plurality of concrete test specimens, determining a speed of surface waves in the concrete foundation, estimating compressive strength of the concrete foundation based on the compressive strength measurements and corresponding surface wave speeds for the plurality of concrete test specimens and the speed of surface waves in the concrete foundation.

In embodiments of the first aspect, determining a speed of surface waves in the concrete foundation can include receiving sensor data from a first accelerometer and sensor data from a second accelerometer, wherein the first accelerometer and the second accelerometer are in a spaced relationship relative to each other and the concrete foundation, wherein the sensor data results from surface waves on the concrete foundation triggering the first and second accelerometers, determining a first time of arrival of the surface waves at the first accelerometer, determining a second time of arrival of the surface waves at the second accelerometer, and dividing a distance between the first accelerometer and the second accelerometer by a difference between the first time of arrival and the second time of arrival.

In embodiments of the first aspect, the sensor data from the first accelerometer and the sensor data from the second accelerometer are subjected to one or more quality checks. The one or more quality checks can include determining that an amplitude in the sensor data does not exceed a predetermined threshold. The one or more quality checks can further include determining that amplitudes in the sensor data do not fluctuate less than a predetermined threshold. The one or more quality checks can further include determining that the sensor data does not contain amplitude fluctuations greater than a predetermined threshold for a period of time preceding the arrival of surface waves at the accelerometers. The one or more quality checks can further include determining that the second time of arrival does not precede, in time, the first time of arrival. The one or more quality checks can further include determining that the sensor data does not contain amplitude fluctuations greater than a predetermined threshold for a period of time after the fluctuations associated with the surface waves.

In embodiments of the first aspect, determining a speed of surface waves in the concrete foundation can include receiving sensor data from a first accelerometer and sensor data from a second accelerometer, wherein the first accelerometer and the second accelerometer are in a spaced relationship relative to each other and the concrete foundation, wherein the sensor data results from surface waves on the concrete foundation triggering the first and second accelerometers. The method can further include, from the sensor data received from the first accelerometer, determining a first accelerometer maximum peak and a first accelerometer minimum peak, and from the sensor data received from the second accelerometer, determining a second accelerometer maximum peak and a second accelerometer minimum peak. The method can further include determining a max-to-max wave speed based on the first accelerometer maximum peak and the second accelerometer maximum peak, determining a min-to-min wave speed based on the first accelerometer minimum peak and the second accelerometer minimum peak, and determining the speed of surface waves in the concrete foundation based on the max-to-max wave speed and the min-to-min wave speed.

In embodiments of the first aspect, determining the speed of surface waves in the concrete foundation based on the max-to-max wave speed and the min-to-min wave speed can include determining that the max-to-max wave speed is within an expected range of surface wave speeds in the concrete foundation, determining that the min-to-min wave speed is within an expected range of surface wave speeds in the concrete foundation, and averaging the max-to-max wave speed and the min-to-min wave speed.

In embodiments of the first aspect, determining a speed of surface waves in the concrete foundation can include receiving sensor data from a first accelerometer and sensor data from a second accelerometer, wherein the first accelerometer and the second accelerometer are in a spaced relationship relative to each other and the concrete foundation, wherein the sensor data results from a plurality of test events, wherein each test event comprises surface waves on the concrete foundation triggering the first and second accelerometers. The method can further include, from the sensor data, determining a plurality of max-to-max wave speeds and a plurality of min-to-min wave speeds, calculating an average max-to-max wave speed based on the plurality of max-to-max wave speeds, calculating an average min-to-min wave speed based on the plurality of min-to-min wave speeds, and calculating an average of the average max-to-max wave speed and the average min-to-min wave speed.

In embodiments of the first aspect, calculating an average max-to-max wave speed based on the plurality of max-to-max wave speeds can include identifying clusters of max-to-max wave speeds from the plurality of max-to-max wave speeds that fall within a threshold range of other max-to-max wave speeds, selecting the cluster having the most max-to-max wave speeds, determining that the selected cluster contains more than a threshold number of max-to-max wave speeds, and averaging the max-to-max wave speeds for the selected cluster.

In embodiments of the first aspect, calculating an average min-to-min wave speed based on the plurality of min-to-min wave speeds can include identifying clusters of min-to-min wave speeds from the plurality of min-to-min wave speeds that fall within a threshold range of other min-to-min wave speeds, selecting the cluster having the most min-to-min wave speeds, determining that the selected cluster contains more than a threshold number of min-to-min wave speeds, and averaging the min-to-min wave speeds for the selected cluster.

In embodiments of the first aspect, the method can further include using machine learning to estimate compressive strength of the concrete foundation, wherein the machine learning receives, as training data, the compressive strength measurements and corresponding surface wave speeds for the plurality of concrete test specimens, and wherein the machine learning further receives, as input, the speed of surface waves in the concrete foundation. In some embodiments, using machine learning can include fitting one or more regression models to the training data and one or more hyperparameters associated with the training data. In some embodiments, the one or more regression models can include one or more linear, non-linear, or ensemble models. In some embodiments, using machine learning can include fitting a plurality of regression models to the training data and one or more hyperparameters associated with the training data, and selecting the regression model having the lowest mean absolute error. In some embodiments, the selected regression model can be used to estimate compressive strength of the concrete foundation.

In a second aspect, a method for estimating compressive strength of a concrete foundation is provided. The method includes correlating compressive strength measurements for a plurality of concrete test specimens with surface wave speeds in the concrete test specimens, applying regression analysis to the compressive strength measurements and surface wave speeds for the plurality of concrete specimens to express compressive strength as a function of surface wave speed, determining a speed of surface waves for the concrete foundation, wherein the concrete foundation is not one of the concrete test specimens, and determining an estimate of compressive strength of the concrete foundation by substituting the determined speed of surface waves for the concrete foundation into the function.

In embodiments of the second aspect, the function can be a fourth order polynomial having the form of $y=Ax^4++Bx^3+Cx^2+Dx+k$, where y is compressive strength, A, B, C, D, and k are constants, and x is surface wave speed.

Any of the features of each embodiment or method is applicable to all aspects of embodiments and methods disclosed herein. Further, any of the features of an embodiment or method is combinable, in whole or in part, with other embodiments or methods disclosed herein. For example, one, two, or three or more embodiments or methods can be combined in whole or in part. Moreover, any of the features of an embodiment or method may be optional when combined with other embodiments or methods.

DRAWINGS

The foregoing and other objects, features, and advantages of the devices, systems, and methods described herein will be apparent from the following description of particular embodiments thereof, as illustrated in the accompanying figures, where like reference numbers refer to like structures. The figures are not necessarily to scale, emphasis instead being placed upon illustrating the principles of the devices, systems, and methods described herein.

DESCRIPTION

Figure 1:
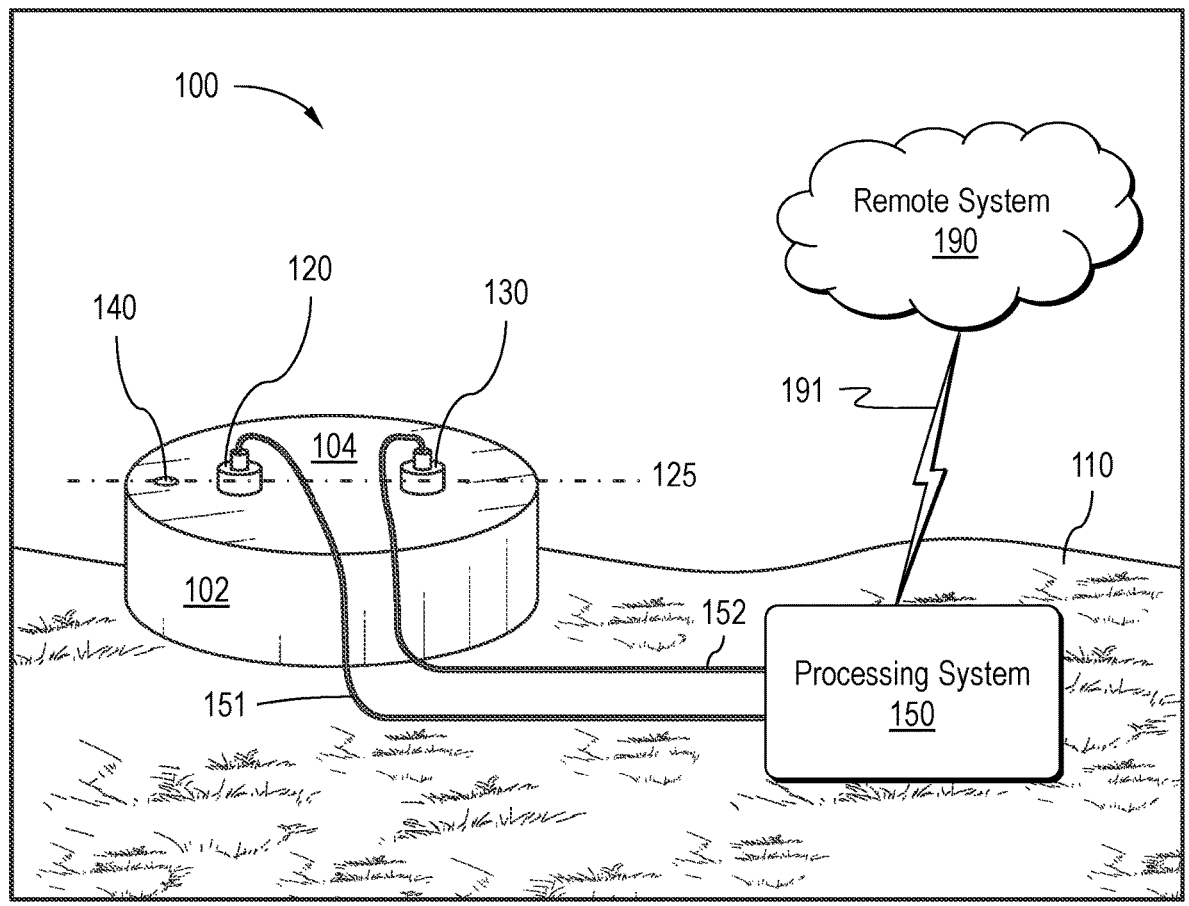
FIG. 1 is a schematic diagram illustrating an example setup of a system for measuring surface wave speeds in exposed concrete.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms unless otherwise stated or clear from context.

As used herein, the terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or "the like") provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

As used herein, the term "and/or" means any one or more of the items in the list joined by "and/or." As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y, and/or z" means "one or more of x, y, and z."

As used herein, the terms "exemplary" and "example" mean "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage or mode of operation.

As used herein, the term "data" is a broad term and is to be given its ordinary and customary meaning to a person of ordinary skill in the art, and refers without limitation to any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

As used herein, the terms "memory" and "memory device" are broad terms and are to be given their ordinary and customary meaning to a person of ordinary skill in the art, and refer without limitation to computer hardware or circuitry to store information. Memory or memory device can be any suitable type of computer memory or other electronic storage means including, for example, read-only memory (ROM), random access memory (RAM), dynamic RAM (DRAM), static RAM (SRAM), ferroelectric RAM (FRAM), cache memory, compact disc read-only memory (CDROM), electro-optical memory, magneto-optical memory, masked read-only memory (MROM), programmable read-only memory (PROM), erasable programmable read-only memory (EPROM), electrically-erasable programmable read-only memory (EEPROM), rewritable read-only memory, flash memory, or the like. Memory or memory device can be implemented as an internal storage medium and/or as an external storage medium. For example, memory or memory device can include hard disk drives (HDDs), solid-state drives (SSDs), optical disk drives, plug-in modules, memory cards (e.g., xD, SD, miniSD, microSD, MMC, etc.), flash drives, thumb drives, jump drives, pen drives, USB drives, zip drives, a computer readable medium, or the like.

As used herein, the term "processor" is a broad term and is to be given its ordinary and customary meaning to a person of ordinary skill in the art, and refers without limitation to processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, microprocessors, microcontrollers, programmable devices and systems, field-programmable gate arrays (FPGAs), application-specific integrated circuits (ASICs), systems on a chip (SoC), systems comprising discrete elements and/or circuits, state machines, virtual machines, data processors, processing facilities, digital signal processing (DSP) processors, and combinations of any of the foregoing. A processor can be coupled to, or integrated with, memory or a memory device.

As used herein, the term "network" is a broad term and is to be given its ordinary and customary meaning to a person of ordinary skill in the art, and refers without limitation to any communication network including, for example, an extranet, intranet, inter-net, the Internet, local area network (LAN), wide area network (WAN), metropolitan area network (MAN), wireless local area network (WLAN), ad hoc network, wireless ad hoc network (WANET), mobile ad hoc network (MANET), or the like.

As used herein, the term "estimate" or "estimating" is a broad term and is to be given its ordinary and customary meaning to a person of ordinary skill in the art, and refers without limitation to calculating an approximate or rough value of something without performing a direct measurement to determine the actual value. For example, estimating the compressive strength of concrete refers to calculating an approximate or rough value of compressive strength without making a direct measurement of compressive strength.

The present disclosure provides systems and methods for estimating the compressive strength of concrete based on the speed of surface waves. Surface waves can be generated in above- or below-grade concrete structure and detected using instrumentation, such as with accelerometers. The speed of the surface waves can be determined by dividing the distance between two points by the time it takes surface waves to propagate between the two points. The compressive strength of the concrete can be estimated from the surface wave speed measurements using regression analysis or a machine learning algorithm. The regression analysis and machine learning algorithm can include training data in which known compressive strengths are correlated with surface wave speeds in concrete test specimens.

The present disclosure also provides systems and methods to accurately calculate surface wave speeds. The disclosure provides a three-part post-processing algorithm in which data received from accelerometers can be checked for quality and accuracy. The present disclosure also provides computing devices that can enable a field person to conduct surface wave speed measurements and compressive strength measurements. The computing devices can contain software that executes the post-processing algorithm, regression analysis, or the machine learning algorithm to provide real-time measurements of compressive strength. The computing devices, and the disclosed systems generally, can be used to implement any of the methods disclosed herein.

Example Systems

FIG. 1 is a schematic diagram illustrating an example setup of a system 100 for measuring surface wave speed in an exposed concrete portion of a concrete structure, e.g., a concrete pier 102. As illustrated in FIG. 1, the concrete pier 102 lies above the ground 110 and has a top surface 104.

The system 100 can include a first accelerometer $A_1$ 120 and a second accelerometer $A_2$ 130. Accelerometers $A_1$ and $A_2$ can be any type of accelerometer, including, for example, a capacitive micro-electro-mechanical systems (MEMS) accelerometer, a piezoresistive accelerometer, or a piezoelectric accelerometer. In the system 100, accelerometers $A_1$ 120 and $A_2$ 130 can be detachably coupled to the surface 104 of concrete pier 102 by using wax, for example, which can be melted with a blow torch. The wax can be melted while on the surface 104 of the concrete pier 102, or the wax can be melted external to the concrete pier 102 and poured onto the surface 104. Accelerometers $A_1$ 120 and $A_2$ 130 can be placed on the melted wax on the surface 104. Other means of detachably coupling accelerometers $A_1$ 120 and $A_2$ 130 to the surface 104 can be used, including, for example, adhesives, such as tape or glue, and magnets.

Accelerometers $A_1$ 120 and $A_2$ 130 can be placed on surface 104 of concrete pier 102 and in a spaced relationship relative to each other and concrete pier 102 as shown in FIG. 1. The distance between accelerometers $A_1$ 120 and $A_2$ 130 can be, for example, any distance sufficient to measure the speed of a surface wave traveling from accelerometer $A_1$ 120 to accelerometer $A_2$ 130, which is explained in more detail herein. For example, the distance between accelerometers $A_1$ and $A_2$ can be 1, 2, 3, 4, 5, 6, 7, 8, 9, 10, 15, 20, 30, 40, or 50 inches, including any greater, lesser, or intermediate value (including fractional values). For example, in one embodiment, accelerometer $A_1$ 120 is placed approximately eighteen (18) inches from accelerometer $A_2$ 130. The distance between accelerometer $A_1$ 120 and accelerometer $A_2$ 130 can be measured using any suitable means, such as a tape measure.

Surface waves can be imparted onto the surface 104 of concrete pier 102 approximately at a point 140. For example, in some embodiments, a hand-held impact device such as a ball-peen hammer, a 4-pound hammer, or the like, can be used to strike concrete pier 102 approximately at point 140 to create surface waves that travel along the surface of concrete pier 102. In some embodiments, surface waves can be created using other means, such as with a piezoelectric disc. One advantage of using a piezoelectric disc is that the impact that creates surface waves will be relatively constant among multiple test events.

Point 140 can be roughly located on surface 104 along axis 125 that connects accelerometers $A_1$ and $A_2$. The point 140 is preferably located on a side of accelerometer $A_1$ 120 along axis 125 in a direction opposite of accelerometer $A_2$ 130. That is, point 140 is not located between accelerometers $A_1$ and $A_2$. In this way, a surface wave generated at point 140 will travel along surface 104 and reach accelerometer $A_1$ 120 before reaching accelerometer $A_2$ 130. This is explained in more detail below.

Where point 140 is located on surface 104 is flexible and it need not be located exactly along the axis 125. For example, accelerometer $A_1$ 120 and accelerometer $A_2$ 130 can be detachably coupled to surface 104. Axis 125 can be identified visually and surface waves can be generated by striking surface 104 roughly along axis 125 at point 140. The strike need not be exactly on axis 125, but can be roughly along the axis. Point 140 can be any distance from accelerometer $A_1$ 120 that is sufficient for surface waves to travel from point 140 and trigger accelerometers $A_1$ and $A_2$ (as explained in more detail below). For example, the distance from point 140 to $A_1$ 120 can be 1, 2, 3, 4, 5, 10, 15, or 20 inches, including any greater, lesser, or intermediate value (including fractional values). For example, in some embodiments, the distance from point 140, where surface waves are generated, to accelerometer $A_1$ 120 can be approximately six (6) inches. Although point 140 and accelerometers A1 120 and A2 130 are illustrated on top surface 104 of concrete pier 102, any surface of concrete pier 102 will work with the systems and methods disclosed herein, including for example, a side of concrete pier 102.

The speed of surface waves traveling from point 140, through accelerometer $A_1$ 120, and to accelerometer $A_2$ 130 can be determined by dividing the distance between accelerometer $A_1$ 120 and accelerometer $A_2$ 130 by the time elapsed for the waves to travel from accelerometer $A_1$ 120 to accelerometer $A_2$ 130, where the speed or velocity of the waves is equal to distance/time elapsed. As explained in more detail herein, the distance between accelerometers $A_1$ and $A_2$ can be measured (e.g., using a tape measure) while the time elapsed for a wave to travel from $A_1$ to $A_2$ can be detected using instrumentation.

It is noted that, while the system 100 illustrated in FIG. 1 includes two accelerometers for receiving and providing data and signals in response to surface waves, other configurations are possible. For example, in some embodiments, only one accelerometer can be used. In these embodiments, the strike to surface 104 itself can begin a test event and the time it takes the generated surface waves to reach the accelerometer can be determined as the time between the strike and the triggering of the accelerometer. As one non-limiting example, if the thickness of the concrete foundation is known, the time that it takes the surface waves to reach the bottom of the concrete foundation and trigger the accelerometer can be determined. The thickness of the concrete can be determined, for example, using the systems and methods disclosed in U.S. patent application Ser. No. 17/605,434, titled "SYSTEMS AND METHODS FOR ESTIMATING CONCRETE THICKNESS" and filed on Oct. 21, 2021, which is a U.S. national stage application of PCT/US2021/024223, the disclosures of which are expressly incorporated herein by reference in their entireties for all purposes. Other examples of determining the time between the generation of surface waves and the triggering of an accelerometer are possible. In still other embodiments, more than two accelerometers can be used. In these embodiments, the additional accelerometers can be detachably coupled to surface 104 using similar means described above.

Figure 2:
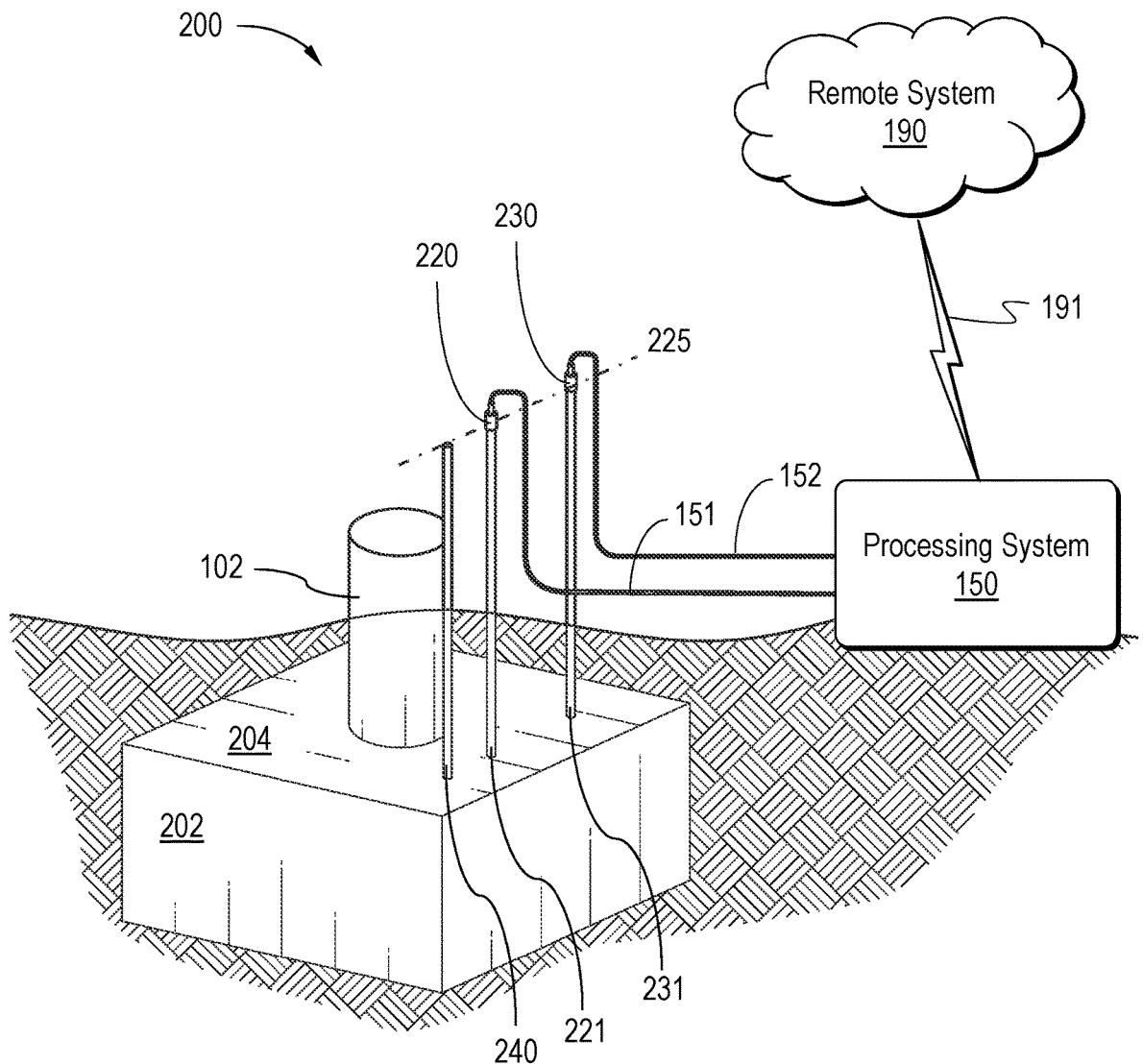
FIG. 2 is a schematic diagram illustrating an example setup of a system for measuring surface wave speeds in buried concrete.

FIG. 2 is a schematic diagram illustrating an example setup of a system 200 for measuring surface wave speeds in a buried concrete portion of a concrete structure, e.g., a concrete pad 202, and without excavation. The setup shown in FIG. 2 illustrates concrete pad 202 and a portion of concrete pier 102 buried beneath the surface of the ground 110 while only a portion of pier 102 remains exposed above the ground (illustrated in FIG. 1). As illustrated in FIG. 2, concrete pad 202 also has a top surface 204.

Generally, the system illustrated in FIG. 2 is similar to that of FIG. 1 in that the top surfaces of concrete (e.g., 104 and 204) are excited at a point (e.g., 140 and 240) to impart surface waves that will propagate along the concrete surfaces and trigger accelerometers (e.g., 120/130 and 220/230). The primary differences between the setups shown in FIGS. 1 and 2 relate to how and where the accelerometers are detachably coupled and how and where surface waves are generated. For example, in the system illustrated in FIG. 1, accelerometers $A_1$ 120 and $A_2$ 130 can be detachably coupled directly to the concrete pier 102 and surface waves can be generated by directly striking the pier 102 (because the concrete is exposed). In the system of FIG. 2, concrete pad 202 is buried beneath the surface of the ground and therefore the accelerometers are not directly coupled to the concrete, nor are surface waves generated by directly striking the concrete. Instead, accelerometers $A_3$ 220 and $A_4$ 230 are detachably coupled to rods, which are driven into contact with pad 202, and surface waves are imparted onto pad 202 by striking another rod, which is also driven into contact with pad 202. Accordingly, compressive strength can be estimated without excavation unlike with prior methods.

Therefore, system 200 illustrated in FIG. 2 can include a first rod $R_1$ 240, a second rod $R_2$ 221, and a third rod $R_3$ 231 that are driven through the ground and into contact with top surface 204 of concrete pad 202. As explained in more detail herein, rod $R_1$ can be excited to impart surface waves that, in turn, excite rods $R_2$ and $R_3$. Rods $R_1$, $R_2$, and $R_3$ can be made of any suitable material capable of transmitting and/or receiving mechanical waves, including, for example, copper, steel, aluminum, and copper-coated steel. Rods $R_1$, $R_2$, and $R_3$ can be any thickness that is practical for being driven through the ground and for transmitting and/or receiving mechanical waves. It has been found that rods with a small diameter have the potential to buckle when being driven into the ground, whereas rods with a large diameter tend to be heavy and difficult to work with. In some embodiments, rods $R_1$, $R_2$, and $R_3$ are one-half (½) inch thick copper-coated steel rods. Rods $R_1$, $R_2$, and $R_3$ can be any length that is necessary to remain exposed after being driven through the ground 110 and into contact with top surface 204 of concrete pad 202. The length of rods $R_1$, $R_2$, and $R_3$ may therefore vary depending on the distance from top surface 204 to the surface of the ground 110. In some embodiments, rods $R_1$, $R_2$, and $R_3$ are no longer than 20 feet. Using rods of equal length is preferable because the distance traveled by the waves along each rod will be equal. However, rods of different lengths can also be used by accounting for the difference in distances traveled by the waves and factoring these differences into the calculation of surface wave speeds with appropriate mathematics. Rods $R_1$, $R_2$, and $R_3$ can be driven through the ground using any suitable means, including, for example, a sledgehammer or a jack hammer. It is preferable, though not necessary, that rods $R_1$, $R_2$, and $R_3$ are driven through the ground in a direction perpendicular to top surface 204.

Rods $R_1$, $R_2$, and $R_3$ can be driven through the ground and into contact with top surface 204 at distances apart from one another. The distance between rods $R_2$ 221 and $R_3$ 231 can be, for example, any distance sufficient to measure the speed of surface waves traveling from rod $R_2$ 221 to rod $R_3$ 231. For example, the distance between rods $R_2$ and $R_3$ can be 1, 2, 3, 4, 5, 10, or 20 feet, including any greater, lesser, or intermediate value (including fractional values). In some embodiments, rods $R_2$ and $R_3$ are driven through the ground and into contact with top surface 204 approximately five (5) feet apart. The distance between rods $R_2$ 221 and $R_3$ 231 can be measured at any point, which distance can vary if rods $R_2$ and $R_3$ are not driven perpendicular to top surface 204. In some embodiments, the distance between rods $R_2$ and $R_3$ is measured at ground level. Such distance can be measured using any suitable means, such as a tape measure. The distance between rods $R_2$ and $R_3$ can serve as a proxy for the distance between accelerometers.

Similar to impact point 140 described in connection with FIG. 1, rod $R_1$ 240 can be driven through the ground 110 and into contact with top surface 204 roughly on axis 225 that connects rods $R_2$ and $R_3$, and on a side of $R_2$ along axis 225 in a direction opposite of $R_3$ (i.e., not located between $R_2$ and $R_3$). The distance between rods $R_1$ and $R_2$ can be any distance that is sufficient for surface waves to propagate down rod $R_1$, across the top surface 204 of pad 202, and to rods $R_2$ and $R_3$. For example, the distance between rods $R_1$ and $R_2$ can be 1, 2, 3, 4, 5, 10, or 20 feet, including any greater, lesser, or intermediate value (including fractional values). In some embodiments, the distance between rods $R_1$ and $R_2$ is approximately one (1) foot. As with point 140 in FIG. 1, the placement of rod $R_1$ 240 need not be exactly on axis 225 but can be roughly along the axis.

The system 200 can include a third accelerometer $A_3$ 220 and a fourth accelerometer $A_4$ 230. Accelerometers $A_3$ and $A_4$ can be any type of accelerometer, including, for example, a capacitive micro-electro-mechanical systems (MEMS) accelerometer, a piezoresistive accelerometer, or a piezoelectric accelerometer. Accelerometers $A_3$ and $A_4$ can be the same accelerometers as $A_1$ and $A_2$ used in connection with FIG. 1 or they can be different. The labels "first," "second," "third" and "fourth" with respect to accelerometers $A_1$, $A_2$, $A_3$, and $A_4$ are used for convenience in explaining the principles of the invention and should not be construed to mean that each accelerometer is somehow different. As illustrated in FIG. 2, accelerometers $A_3$ 220 and $A_4$ 230 can be detachably coupled to rods $R_2$ 221 and $R_3$ 231, respectively, such that the accelerometers are in a spaced relationship relative to each other and concrete pad 202. The distance between rods $R_2$ 221 and $R_3$ 231 can thus serve as a proxy for the distance between accelerometers $A_3$ 220 and $A_4$ 230. The accelerometers can be detachably coupled to the rods using magnets, for example. Other means of detachably coupling $A_3$ 220 and $A_4$ 230 to rods $R_2$ 221 and $R_3$ 231 can be used, including, for example, adhesives, such as tape or glue.

In the system 200, rod $R_1$ 240 can be used to impart surface waves onto the top surface 204 of concrete pad 202. Surface waves can be created, for example, using any hand-held impact device such as a ball-peen hammer or a 4-pound hammer to strike rod $R_1$ 240. Surface waves can also be created by other means, including, for example, a piezoelectric disc. Surface waves propagating down rod $R_1$ 240 and along top surface 204 of concrete pad 202 can be received by rods $R_2$ 221 and $R_3$ 231, which in turn, can trigger accelerometers $A_3$ 220 and $A_4$ 230. The term "trigger" means to excite the accelerometer such that it experiences acceleration and generates data in response thereto. The speed of the surface waves can be determined by dividing the distance between rods $R_2$ 221 and $R_3$ 231 by the time elapsed for the waves to trigger accelerometer $A_3$ 220 to accelerometer $A_4$ 230, where the speed or velocity of the waves is equal to distance/time elapsed. As explained in more detail herein, the distance between rods $R_2$ and $R_3$ can be measured (e.g., using a tape measure) while the time elapsed for a wave to travel from $R_2$ to $R_3$ can be detected using instrumentation.

As noted above with respect to FIG. 1, the system shown in FIG. 2 can also include fewer or more than two accelerometers for the same reasons. If additional accelerometers are used in connection with the system of FIG. 2, additional rods will be needed.

The systems shown in FIGS. 1 and 2 each include a processing system 150 and remote system 190, which are now explained. Processing system 150 can be connected to the accelerometers in each system (i.e., system 100 of FIG. 1 or system 200 of FIG. 2) through transmission media 151 and 152. Signals from the accelerometers (e.g., $A_1$, $A_2$, $A_3$, $A_4$) can include analog signals, digital signals, pulse-width modulated (PWM) signals, and other types of signals depending on the type of accelerometers used. Transmission media 151 and 152 can include wired or wireless links. For example, transmission media 151 and 152 can comprise wired transmission lines (e.g., as shown in FIGS. 1 and 2) capable of transmitting signals received from the accelerometers to processing system 150. In some embodiments, transmission media 151 and 152 are coaxial transmission lines that receive analog signals from the accelerometers. In some embodiments, transmission media 151 and 152 are not wired transmission lines, but rather a medium through which data is received from the accelerometers wirelessly. That is, data can be transmitted from the accelerometers to processing system 150 over wireless links using, for example, a radio frequency (RF) technology, near field communication (NFC), Bluetooth, Bluetooth Low Energy, IEEE 802.11x (i.e., Wi-Fi), Zigbee, Z-Wave, Infrared (IR), cellular, and other types of wireless technologies. In some embodiments, transmission media 151 and 152 comprise both wired and wireless connections.

Figure 3:
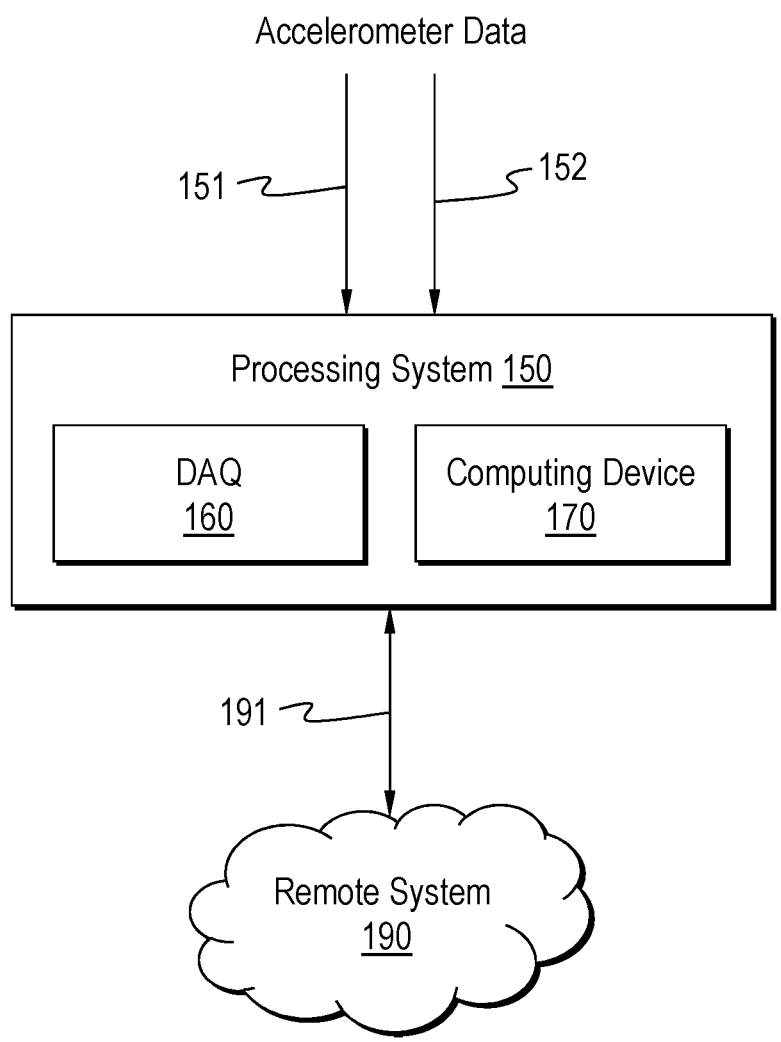
FIG. 3 is a simplified block diagram illustrating accelerometers in communication with a processing system.

FIG. 3 is a simplified block diagram illustrating accelerometers (e.g., $A_1$, $A_2$, $A_3$, $A_4$) in communication with processing system 150 according to the systems shown in FIGS. 1 and 2. Signals generated by the accelerometers can relate to time, voltage, acceleration, and other information. Processing system 150 interfaces with, and receives signals from, the accelerometers relating to a test event (i.e., a surface wave speed measurement), then stores, processes, and analyzes the data. As illustrated in FIG. 3, processing system 150 can include a data acquisition system (DAQ) 160 and a computing device 170. Signals from the accelerometers are received by DAQ 160, which amplifies, digitizes, filters, and/or processes the signals to generate data associated with the test event, which data is then transmitted to computing device 170 for analysis. Processing system 150 (e.g., DAQ 160) can also power the accelerometers with appropriate power.

As further illustrated in FIG. 3, processing system 150 can be in bi-directional communication with remote system 190. Remote system 190 can comprise a network, such as a private network, the cloud, the Internet, or the like, and can further comprise one or more servers, databases, and computing devices, and combinations of the foregoing. The computing devices of remote system 190 can include one or more tablets, smartphones, laptop computers, desktop computers, servers, or the like. For example, in one embodiment, remote system 190 is a laptop computer that is at the work site where the disclosed systems and methods are applied. In some embodiments, remote system 190 is a computer network comprising servers and computing devices that are off site. In some embodiments, remote system 190 is the cloud. Processing system 150 can be in communication with remote system 190 via communication medium 191. Communication medium 191 can comprise a wired or wireless connection, or a combination of both. For example, in some embodiments, communication medium 191 can be a wired connection, such as a coaxial transmission line, USB cable, Ethernet cable, and other types of suitable wired connections. In some embodiments, communication medium 191 can be a suitable wireless connection such as, for example, a radio frequency (RF) technology, near field communication (NFC), Bluetooth, Bluetooth Low Energy, IEEE 802.11x (i.e., Wi-Fi), Zigbee, Z-Wave, Infrared (IF), optical, cellular, and other types of wireless technologies.

In some embodiments, processing system 150 receives data from the accelerometers, processes and stores the data, and transmits the data to remote system 190, where it can be further stored, analyzed, and/or processed. In some embodiments, processing system 150 receives commands and data from remote system 190. For example, remote system 190 may transmit commands and/or data to control all or part of processing system 150.

Processing system 150 can comprise different configurations. For example, DAQ 160 and computing device 170 can be standalone devices. In this configuration, DAQ 160 can receive signals from the accelerometers, process the signals to generate data, then transmit the data to computing device 170 for analysis. In some embodiments, DAQ 160 can be incorporated into computing device 170 such that computing device 170 interfaces directly with the accelerometers. Computing device 170 can be a tablet, laptop computer, desktop computer, or the like.

Figure 4:
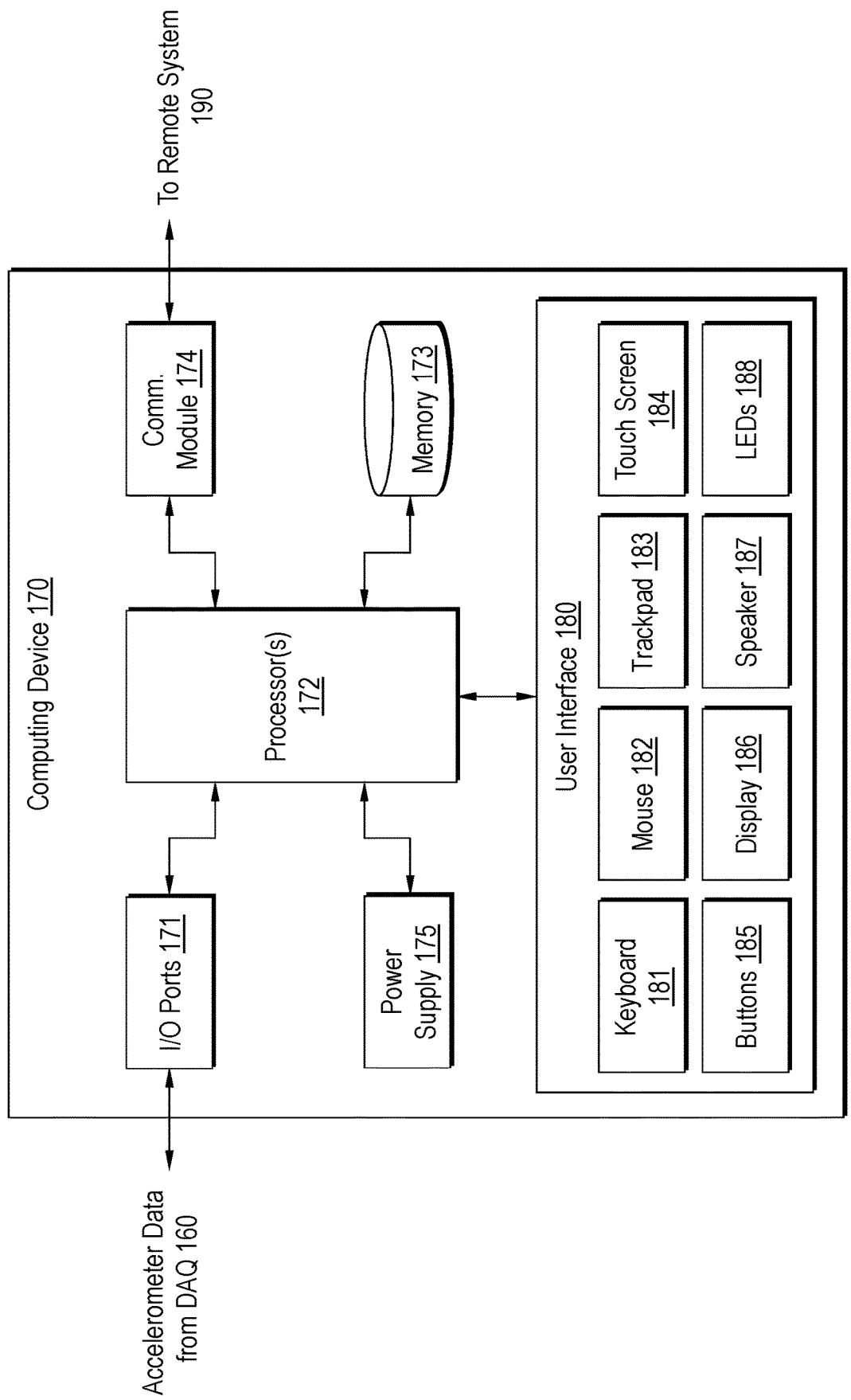
FIG. 4 is a block diagram illustrating an example computing device according to some embodiments.
Figure 5:
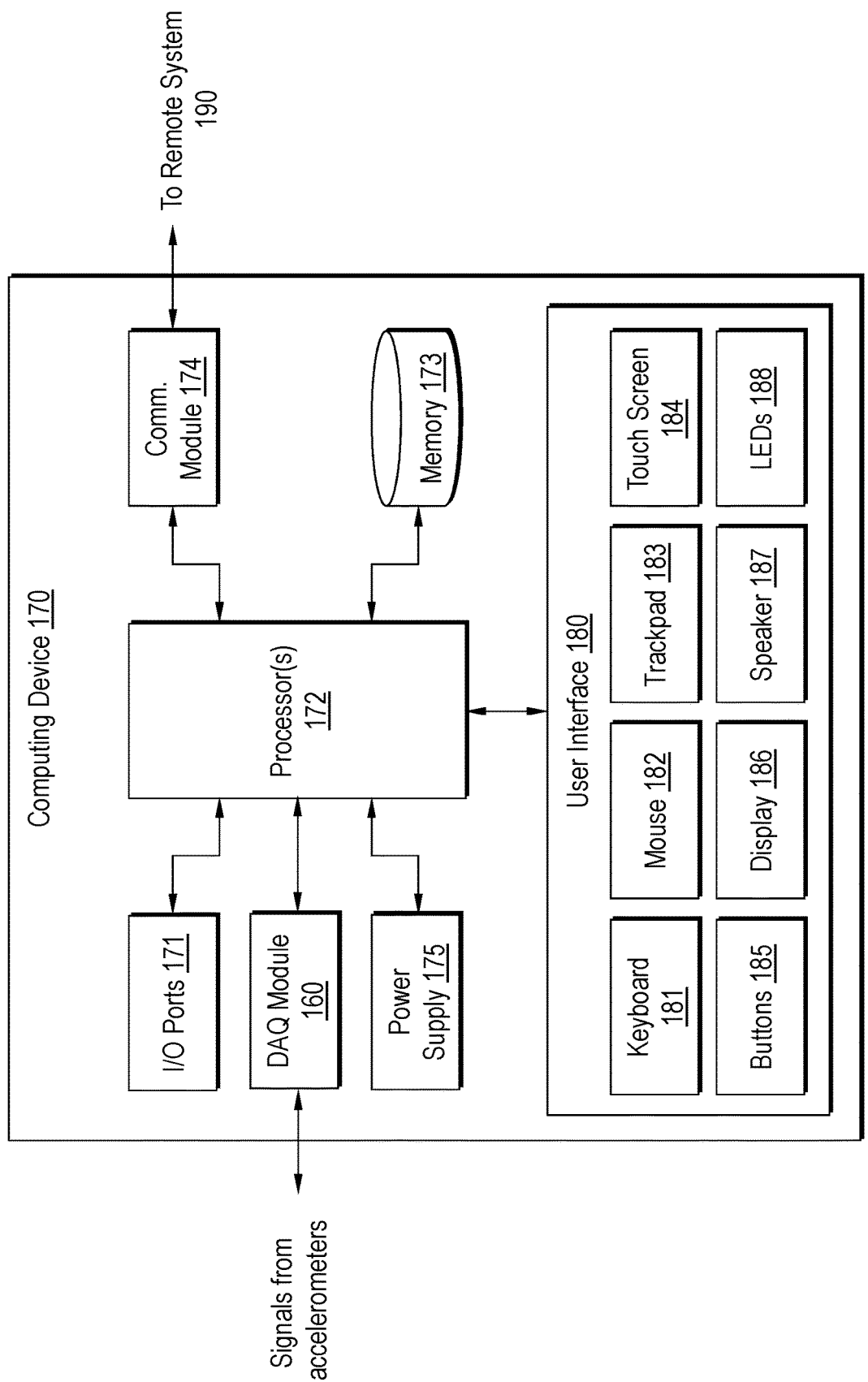
FIG. 5 is a block diagram illustrating an example computing device according to some embodiments.

FIG. 4 is a block diagram illustrating an example computing device 170 according to some embodiments. As illustrated, computing device 170 can receive accelerometer data from DAQ 160 via I/O ports 171. I/O ports 171 can comprise ports that enable computing device 170 to communicate with peripheral equipment. For example, I/O ports 171 can comprise serial ports such as USB ports, coaxial ports, ports for communicating over RS-232, RS-422, RS-485, and other protocols, Ethernet ports, VGA ports, HDMI ports, and the like. FIG. 5 is a block diagram illustrating an alternative example computing device 170 in which DAQ 160 is incorporated into computing device 170 so that computing device 170 interfaces directly with the accelerometers. While the embodiment shown in FIG. 5 illustrates DAQ module 160 receiving signals from the accelerometers, the signals can be alternatively received at I/O ports 171 and transmitted to DAQ module 160, as appropriate.

Computing device 170 can include hardware, firmware, and/or software that generally enables a user to interact with the systems, to receive, store, process, and analyze accelerometer and other data, to transmit data and commands to remote system 190, and/or to receive data and commands from remote system 190. Accelerometer data, whether received from a standalone or an integrated DAQ 160, can be provided to processor(s) 172.

Processor(s) 172 can be coupled to and/or include one or more memory devices 173. The one or more memory devices 173 can store data, such as accelerometer data, data received from a user, and data received from remote system 190. The one or more memory devices 173 can also store software (i.e., computer-executable instructions). Processor(s) 172 can process data, wherein the processing can include, for example, amplifying, converting from analog to digital or digital to analog, conditioning, filtering, analyzing, and/or transforming the data. Processor(s) 172 can also serve as a central control unit of computing device 170. For example, software stored in memory 173 can comprise operating system software, firmware, and other system software for controlling computing device 170 and its components. Software can further include data processing software and application software as discussed in more detail below. In some embodiments, processor(s) 172 comprises multiple processors (coupled to and/or including additional memory). The multiple processors can be used for different purposes. For example, one processor can be used to receive and process accelerometer data, while another processor can be used to control computing device 170 and/or execute application software to analyze the accelerometer data.

Computing device 170 can include a user interface 180 that comprises input and output components configured to allow a user to interact with computing device 170 and the systems generally. For example, user interface 180 can include a keyboard 181, mouse 182, trackpad 183, touch-sensitive screen 184, one or more buttons 185, display 186, speaker 187, and one or more LED indicators 188. Processor(s) 172 can control user interface 180 and its components. For example, processor(s) 172 can receive data and commands from devices connected to I/O ports 171 and provide data and commands to components through I/O ports 171. Processor(s) 172 can execute software stored in the one or more memory devices 173 to cause a graphical user interface (GUI) to be displayed on display 186. The GUI can provide the user with an intuitive and user-friendly means for interacting with the system, including to provide output to the user such as prompts, messages, notifications, warnings, alarms, or the like.

The components of user interface 180 include controls to allow a user to interact with computing device 170. For example, the keyboard 181, mouse 182, and trackpad 183 can enable receiving input from the user. The touch-sensitive screen 184 can enable a user to interact with the GUI, for example, by inputting information, making selections, and the like. The one or more buttons 185 can provide for quick and easy selection of options or modes, such as by toggling functions on/off. The display 186 can be an LCD, LED, OLED, or the like. The display 186 can provide the user with visual output. The speaker 187 can provide the user with audible output, such as by alerting the user of notifications, warnings, alarms, or the like. The one or more LED indicators 188 can provide the user with visual indications. For example, one LED indication can represent whether there is sufficient battery power, or whether computing device 170 is receiving power from an external source. Another LED indication can inform the user whether DAQ 160 and/or computing device 170 is in an active state and measuring data received from the accelerometers. Although not illustrated, the user interface 180 can include other components, such as a vibrating component to provide a user with tactile signals, alerts, or feedback, a microphone to enable a user to control DAQ 160 and/or computing device 170 with their voice, and a backlight to facilitate viewing the display in low light conditions.

As further illustrated in FIGS. 4 and 5, computing device 170 can include a communication module 174. Communication module 174 can comprise components to enable communication with remote system 190, such as an antenna, analog front end circuitry, and transceivers. For example, in some embodiments, communication module 174 can comprise components to enable communication over Ethernet, Wi-Fi, and/or cellular technologies. Communication module 174 can also enable computing device 170 to receive software updates.

As also illustrated in FIGS. 4 and 5, computing device 170 can include a power supply 175, which can include rechargeable or disposable batteries. Power supply 175 may also include circuitry to receive power from an external source and to supply the necessary power to computing device 170, such as through an AC adapter. In some embodiments, the external source can be a device that supplies power to computing device 170 over a USB cable, for example.

Computing device 170 can support various other functions. For example, in some embodiments, computing device 170 can include the ability to record and playback data events received from the accelerometers, while also permitting for real-time display of the events. In some embodiments, computing device 170 can include the ability to tag events as they occur. For example, computing device 170 can include one or more buttons 185 that enables a user to insert a marker onto data in real-time. In some embodiments, computing device 170 can permit remote control and monitoring. For example, computing device 170 can be communicatively coupled to a remote system 190 to enable the remote system 190 to view data events in real time and/or to control computing device 170.

It should be noted that FIGS. 4 and 5 are not strict architectural diagrams. Thus, FIGS. 4 and 5 generally illustrate the components of computing device 170, some of which may be combined, separated, or omitted. For example, communication module 174 may comprise several individual modules, some of which enable communication over wired and wireless connections. As another example, processor(s) 172 may comprise several components, such as discrete processing elements for amplifying, converting, conditioning, filtering, and transforming data, and/or programmable circuits for controlling computing device 170 (in addition to performing other functions, such as further processing data). The blocks illustrated in FIGS. 4 and 5 are communicatively coupled in an appropriate manner as will be appreciated by one of ordinary skill in the art.

Operation of the Example Systems

A general explanation for how the systems illustrated in FIGS. 1-5 can be used to estimate compressive strength of concrete is now provided. Software on computing device 170 can comprise computer-executable instructions that, when executed by processor(s) 172, cause processor(s) 172 to generate a graphical user interface (GUI) on display 186. The GUI can allow a user to interact with and control the systems.

For example, the GUI can allow a user to start an application for performing measurements to determine the speed of surface waves in a concrete structure from which the compressive strength can be estimated. The application can prompt the user for information about the tests to be performed, such as a description and location of the concrete structure being investigated, the type of foundation on which the structure is supported, whether the measurements will be performed on an above-grade portion (e.g., pier 102) or a below-grade portion (e.g., pad 202), the user's name, initials, or identification number, and the like. The application can receive pictures of the test setup, equipment, concrete structure, and other aspects of the investigation. For example, the GUI can allow the user to import pictures from an external source and/or enable a camera present on computing device 170 so that the user can take the pictures. The pictures, whether imported or taken with computing device 170, can be associated with the investigation and made part of the file. The application can be programmed to automatically obtain other information (e.g., via an Internet connection), such as GPS coordinates for the structure, current weather conditions, and the current date and time. In some embodiments, historical data relating to previous measurements performed on the structure can be recalled and viewed on the GUI.

The application can proceed to allow the user to begin performing measurements. The GUI can prompt the user to setup the system according to FIG. 1 or FIG. 2 depending on the type of concrete for which the compressive strength is to be estimated. For example, the GUI can provide the user with step-by-step instructions and/or graphical depictions that instruct the user on how and where to connect the various pieces of equipment. If using the system of FIG. 1, the user can detachably couple the accelerometers $A_1$ 120 and $A_2$ 130 to concrete pier 102. If using the system of FIG. 2, the user can drive rods $R_1$, $R_2$, and $R_3$ into contact with concrete pad 202 and detachably couple accelerometer $A_3$ 220 to rod $R_2$ 221 and accelerometer $A_4$ 230 to rod $R_3$ 231. Once the setup is complete, the GUI can prompt the user to measure and record relevant distances. For example, if the system of FIG. 1 has been setup, the GUI can prompt the user to measure the distance between accelerometers $A_1$ 120 and $A_2$ 130 and enter the distance into the application. If the system of FIG. 2 has been setup, the GUI can prompt the user to measure the distance between rods $R_2$ 221 and $R_3$ 231

(e.g., at ground level) and enter the distance into the application. The system can then prepare DAQ 160 to begin receiving signals from the accelerometers. At this point, the user is ready to begin making measurements of surface wave speeds.

If using the system illustrated in FIG. 1, the user can strike top surface 104 of concrete pier 102 one or more times at point 140. This will impart surface waves onto top surface 104, which propagate from point 140 across surface 104 and trigger accelerometer $A_1$ 120, and then accelerometer $A_2$ 130, respectively. Signals from the accelerometers can be received by DAQ 160, which amplifies, digitizes, filters, and/or processes the signals to generate data associated with the test event. The data can be received by processor(s) 172 of computing device 170 and analyzed to determine surface wave speeds. The speed of the surface waves can be determined from the data by dividing the distance between accelerometers $A_1$ 120 and $A_2$ 130 by the difference of arrival times of the surface waves at accelerometer $A_1$ 120 and accelerometer $A_2$ 130. This process can be repeated any number of times and at different locations on the concrete foundation, which can help increase the accuracy of the measurements. For example, in some embodiments, the process is repeated at three different locations on the foundation and the calculated wave speeds are averaged. As explained in more detail herein, the surface wave speeds can then be used to estimate the compressive strength of the concrete.

If using the system illustrated in FIG. 2, the user can strike rod $R_1$ 240 one or more times to impart surface waves onto top surface 204 of concrete pad 202. The surface waves will propagate across surface 204 and to rods $R_2$ 221 and $R_3$ 231, which will trigger accelerometer $A_3$ 220, and then $A_4$ 230, respectively. Signals from the accelerometers can be received by DAQ 160, which amplifies, filters, and/or processes the signals to generate data associated with the test event. The data can be received by processor(s) 172 of computing device 170 and analyzed to determine surface wave speeds. The speed of the surface waves can be determined from the data by dividing the distance measured between rods $R_2$ 221 and $R_3$ 231 by the difference of arrival times of the surface waves at accelerometer $A_3$ 220 and accelerometer $A_4$ 230. This process can be repeated any number of times and at different locations on the concrete foundation, which can help increase the accuracy of the measurements. For example, in some embodiments, the process is repeated at three different locations on the foundation and the calculated wave speeds are averaged. As explained in more detail herein, the surface wave speeds can then be used to estimate the compressive strength of the concrete.

Figure 6:
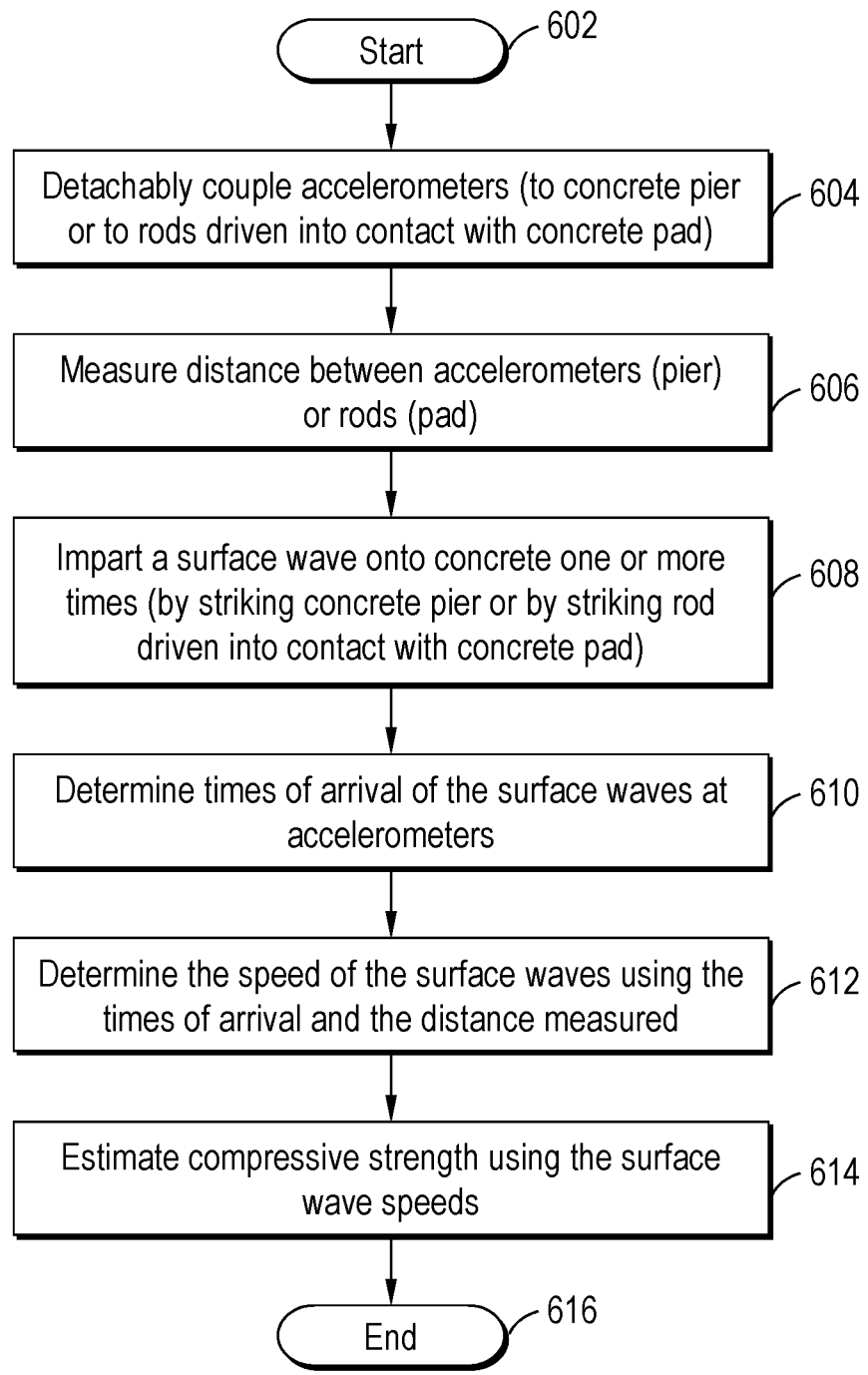
FIG. 6 is a flow diagram illustrating an example method for estimating the compressive strength of concrete.

FIG. 6 is a flow diagram illustrating an example method for estimating the compressive strength of concrete. The method of FIG. 6 may be applied to system 100 of FIG. 1 (for exposed concrete) or to system 200 of FIG. 2 (for buried concrete). The method is described with reference to these systems. In other examples, additional or alternative systems or components can be used to perform the method of FIG. 6.

Figure 17:
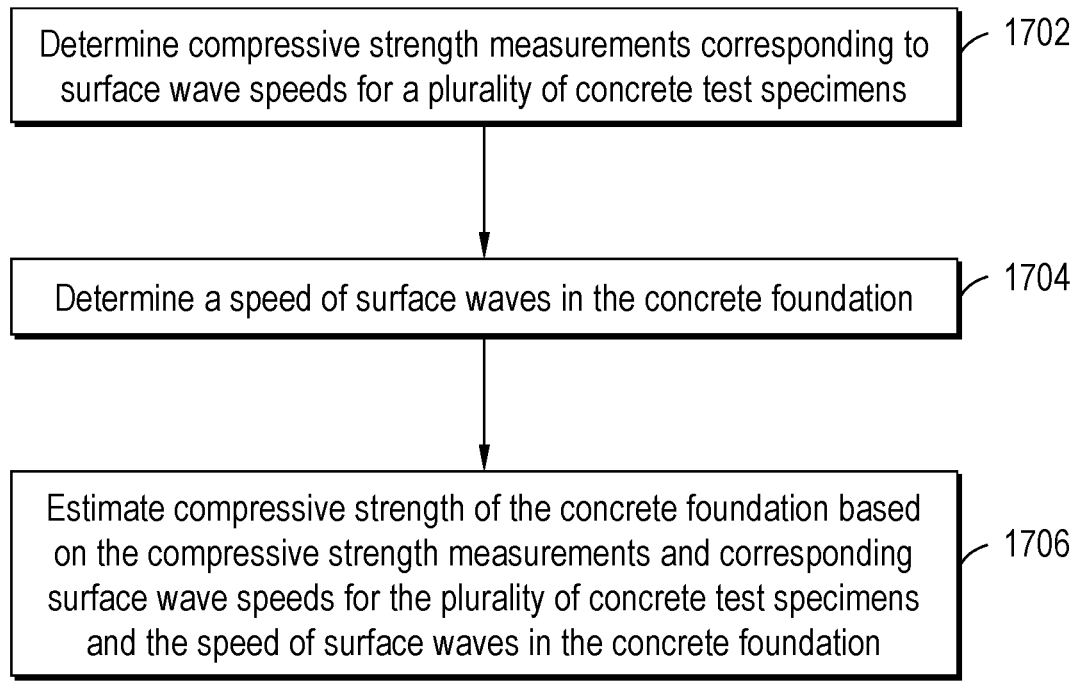
FIG. 17 is a flow diagram illustrating an example method for estimating compressive strength of a concrete foundation.

FIG. 17 is a flow diagram illustrating another example method for estimating the compressive strength of concrete. The method of FIG. 17 may be applied to system 100 of FIG. 1 (for exposed concrete) or to system 200 of FIG. 2 (for buried concrete). The method is described with reference to these systems. In other examples, additional or alternative systems or components can be used to perform the method of FIG. 17.

Figure 18:
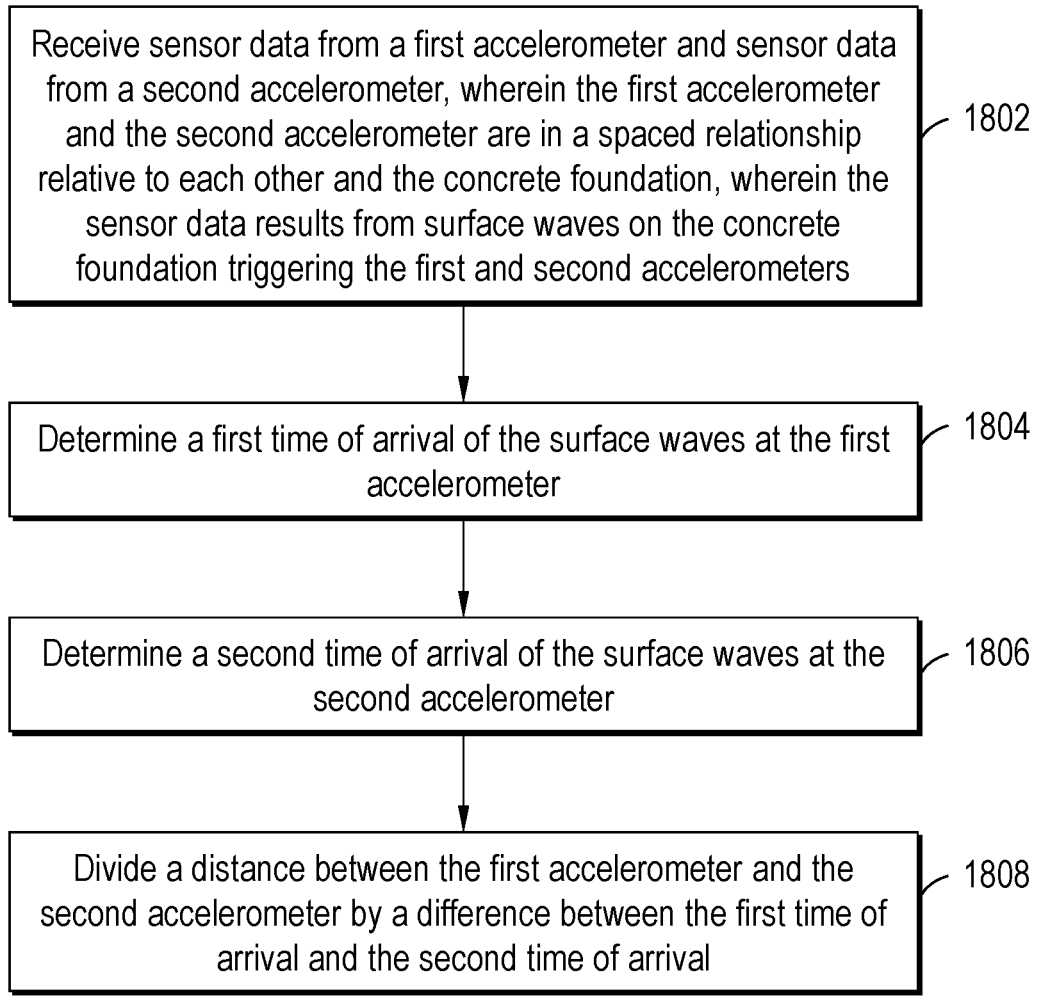
FIG. 18 is a flow diagram illustrating an example method for determining a speed of surface waves in the concrete foundation.

FIG. 18 is a flow diagram illustrating an example method for determining a speed of surface waves in a concrete foundation. The method of FIG. 18 may be suitable for use in conjunction with the method of FIG. 17. Further, the method of FIG. 18 may be applied to systems 100 of FIG. 1 (for exposed concrete) or to system 200 of FIG. 2 (for buried concrete). The method is described with reference to these systems. In other examples, additional or alternative systems or components can be used to perform the method of FIG. 18.

Determining Accurate Surface Wave Speeds.

As described herein, the speed of surface waves can be used to estimate compressive strength of concrete. The accuracy of compressive strength estimates will depend on the accuracy of the surface wave speeds that are calculated. To calculate precise and accurate surface wave speeds in concrete, this disclosure provides an example post-processing algorithm that can be programmed into hardware (e.g., computer, programmable logic, etc.) to analyze data received from accelerometers relating to multiple test events, determine whether the received data contains certain quality characteristics, calculate surface wave speeds from the data, analyze the calculated surface wave speeds to determine which calculations meet certain thresholds, then calculate average surface wave speeds therefrom. The example algorithm can be executed on computing device 170 and/or remote system 190.

The example post-processing algorithm to accurately calculate surface wave speeds is now provided. The algorithm is generally divided into three parts: (1) individual signal quality checks, (2) signal processing to calculate wave speed, and (3) overall analysis of the data sets. Each part is now explained in more detail.

(1) Individual Signal Quality Checks

Each time a field person generates surface waves (referred to as a test event), whether as applied to above- or below-grade portions of a concrete structure, the accelerometers will generate signals from being excited by the surface waves. The signals can be converted into data by DAQ 160. Before the accelerometer data is used to calculate surface wave speeds, the data can be analyzed to ensure that it possesses certain characteristics indicative of a quality signal that can potentially lead to accurate surface wave speed calculations. A number of different checks can be performed on the received data.

Figure 7:
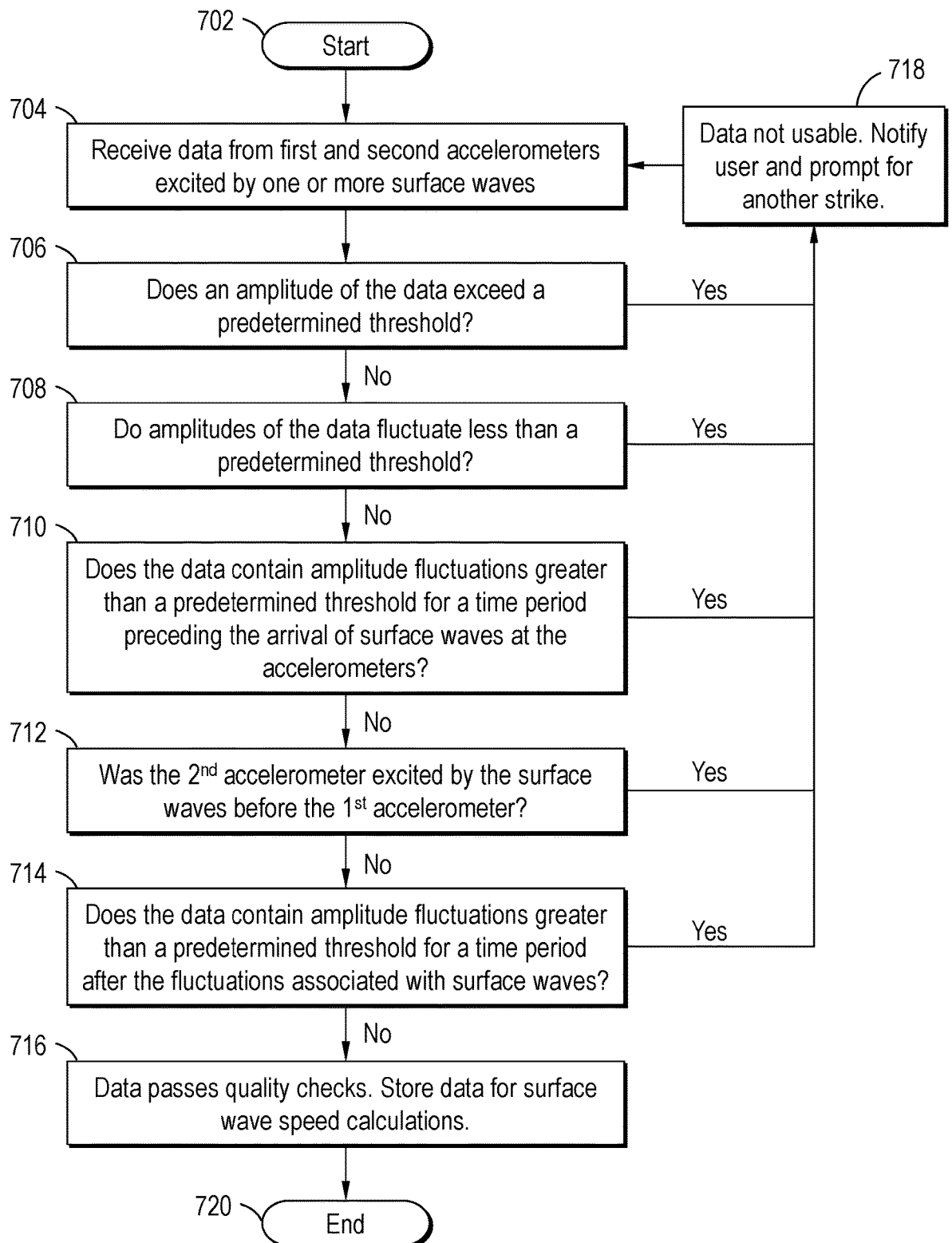
FIG. 7 is a flow diagram illustrating an example method for performing individual signal quality checks on data received from accelerometers.

FIG. 7 is a flow diagram illustrating an example method for performing the individual signal quality checks. The method refers to the systems illustrated in FIGS. 1-5. In other examples, additional or alternative systems or components may be used to perform the method of FIG. 7.

Upon starting at step 702, data from the first and second accelerometers resulting from being excited by one or more surface waves can be received (step 704). At step 706, the data can be analyzed to determine if it contains an amplitude that exceeds a predetermined threshold such that it cannot be captured by the hardware. This is an example of "clipping." Clipping can occur if the user strikes the concrete too hard, for example.

At step 708, the received data can be analyzed to determine if there is little to no changes in amplitude of the data (e.g., flat line) with respect to a predetermined threshold. This can occur if the user strikes the concrete too softly or if there is a problem with one of the accelerometers.

At step 710, the received data can be analyzed to determine if there are large fluctuations greater than a predetermined threshold for a time period preceding the arrival of the surface waves at the accelerometers. For example, the receiver 150 will receive continuous or near continuous data points from the accelerometers (i.e., "pings') once a test event has begun. It is to be expected that the first several data points (e.g., 600 pings) will be relatively flat until a strike is performed and the accelerometers are triggered by the surface waves. Therefore, before data relating to the surface waves are observed, the data points preceding the wave data should be relatively flat. If not, that would likely indicate that there is pre-trigger noise in the data.

At step 712, the received data can be analyzed to determine if the second accelerometer (e.g., $A_2$ 130 or $A_4$ 230) was excited by the surface waves before the first accelerometer (e.g., $A_1$ 120 or $A_3$ 220). If this occurs, it would likely indicate that the accelerometers are not setup correctly. As explained elsewhere herein, when a surface wave is generated, it will propagate from the point of impact toward the accelerometers. Because the impact points (e.g., 140 or 240) are generally located on a side of the first accelerometers opposite the second accelerometers, the surface wave should reach the first accelerometer first. If not, the data may not be usable to accurately determine a surface wave speed.

At step 714, the received data can be analyzed to determine if there is a significant increase in amplitude fluctuations greater than a predetermined threshold for a time period after the fluctuations associated with the surface waves (i.e., near the end of the data). For example, a typical data set from an accelerometer may comprise several thousand pings (e.g., 6000 pings). As the signal progresses, there should be a damping effect such that the amplitude of the data will decrease over time. However, if the amplitude increases at some late point (e.g., around 5000 pings), this will tend to indicate post-trigger noise and the data may not be usable to correctly determine a surface wave speed.

If the received data fails to pass any of the quality checks (i.e., the "Yes" branches after each check in FIG. 7), the data is deemed not usable to determine a surface wave speed (step 718). A notification can be provided to the user on the GUI advising the user that the strike was not successful. The notification can provide information to the user about why the strike failed and offer suggestions for subsequent strikes. For example, the notification can advise the user to "strike the concrete with less force," "strike the concrete with more force," "strike again," "ensure the accelerometers are setup correctly," "check connections to accelerometers," and the like. The notification can prompt the user to make another strike and the method can be repeated beginning at step 704. Once a received set of data passes the individual quality checks, the data can be stored for calculating surface wave speeds (step 716). The user can also be informed that the strike was a valid strike that produced a quality signal. The method ends at step 720.

It should be noted that the individual quality checks illustrated in FIG. 7 need not be performed in the order illustrated and can be performed in any order. Also, every quality check need not be performed. Instead, any one or more quality checks can be performed.

(2) Signal Processing to Calculate Wave Speed

Figure 8:
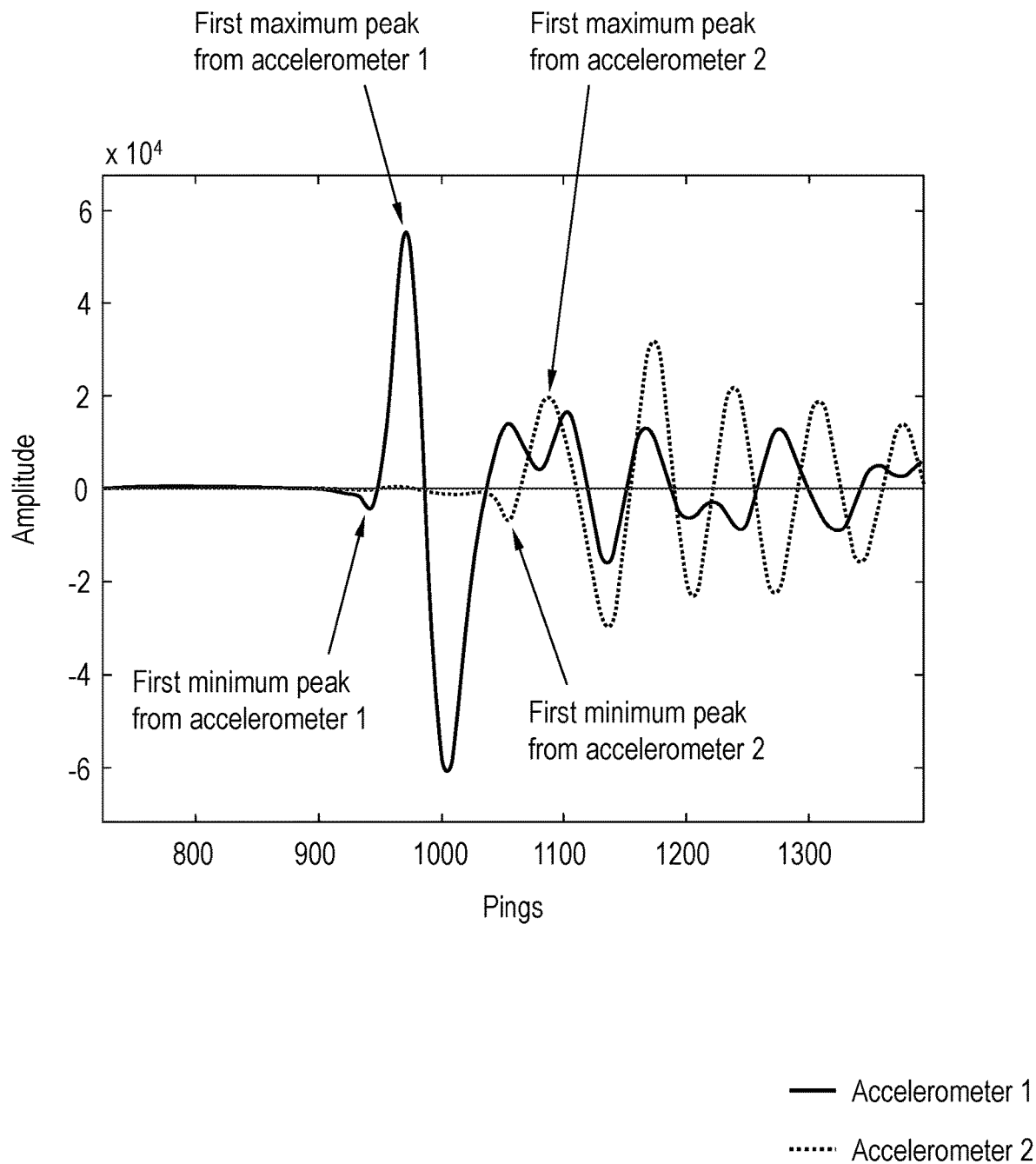
FIG. 8 is a graph diagram illustrating typical accelerometer data from a test event.

Data received from the accelerometers will comprise multi-frequency sinusoidal waveforms (in the time domain) having maximum and minimum peaks (i.e., positive and negative amplitudes). For example, FIG. 8 is a graph diagram illustrating typical accelerometer data from a test event for two accelerometers overlaid on top of each other. As illustrated, each waveform has a first maximum peak (i.e., first positive amplitude) and a first minimum peak (i.e., first negative amplitude). Each set of peaks represents the arrival time of surface waves at the accelerometers. The graph diagram illustrated in FIG. 8 is to help explain the principles of the invention. The algorithm described herein generally operates on discrete data, which provides greater precision than can be achieved by analyzing waveforms graphically.

Figure 9:
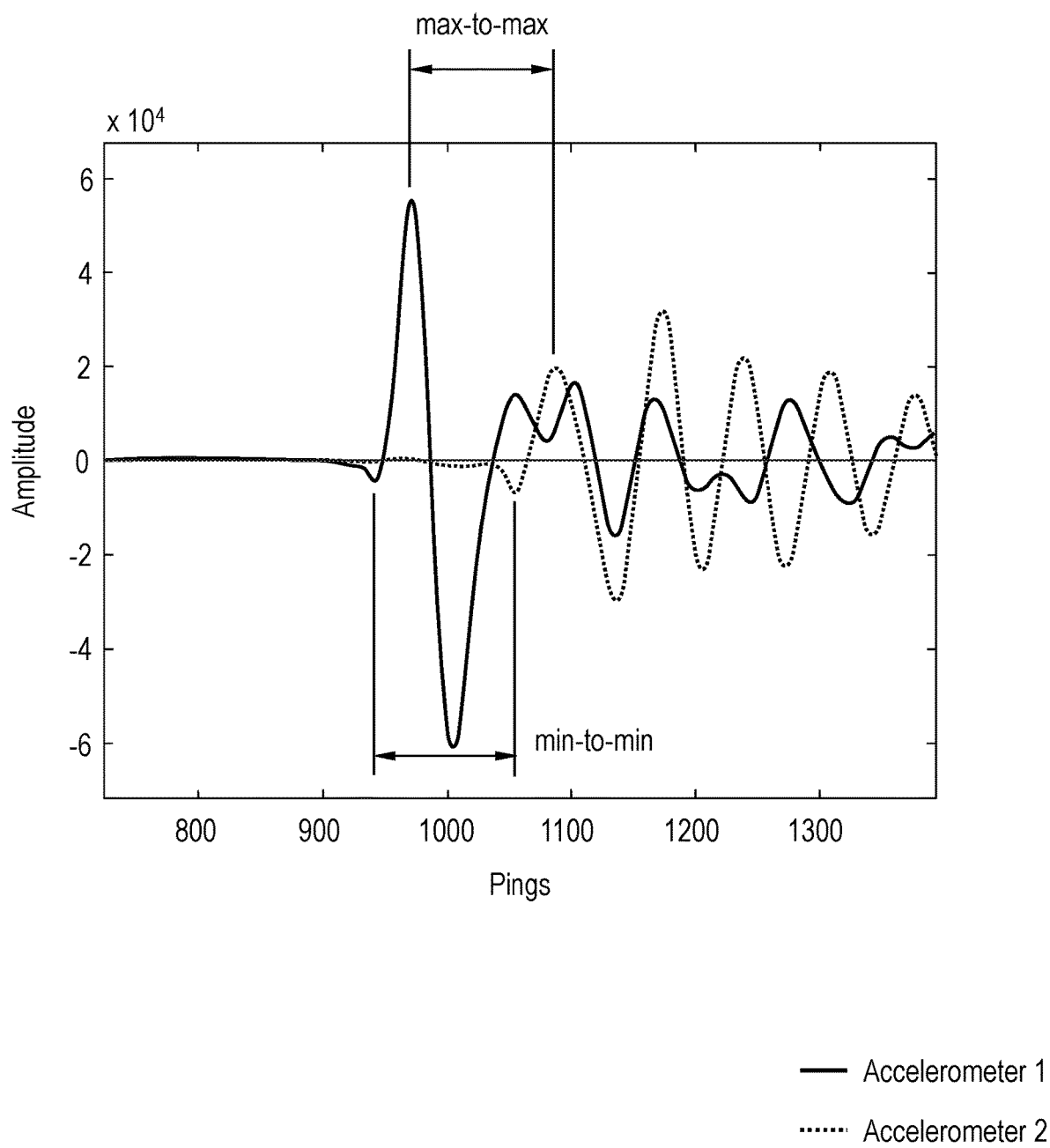
FIG. 9 is a graph diagram of the waveforms of FIG. 8 with annotations.

Two independent wave speeds can be calculated from the received data. One is a max-to-max wave speed, which is a wave speed based on the first maximum peaks and the distance between the accelerometers (or rods). The other is a min-to-min wave speed, which is a wave speed based on the first minimum peaks and the distance between the accelerometers (or rods). FIG. 9 is a graph diagram of the waveforms from FIG. 8 with annotations showing the max-to-max and min-to-min measurements.

Figure 10:
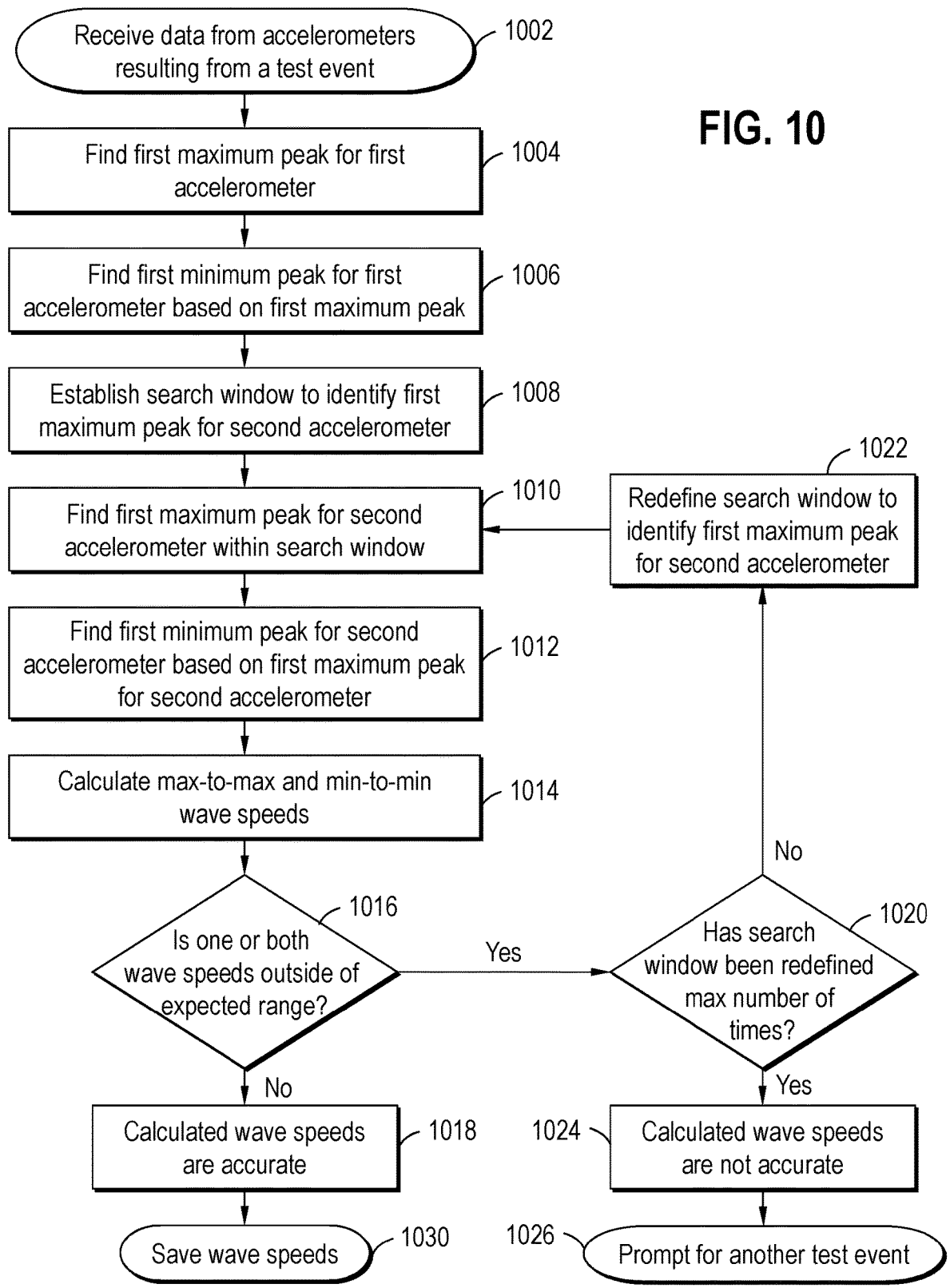
FIG. 10 is a flow diagram illustrating an example method to calculate max-to-max and min-to-min surface wave speeds.

FIG. 10 is a flow diagram illustrating an example method to calculate max-to-max and min-to-min surface wave speeds. The method refers to the systems illustrated in FIGS. 1-5. In other examples, additional or alternative systems or components may be used to perform the method of FIG. 10.

The method for signal processing to calculate wave speeds can begin at step 1002 by receiving data from the accelerometers resulting from a test event. Preferably, the data has passed the individual signal quality checks described above. At step 1004, the method can proceed by identifying the first maximum peak from the data received from the first accelerometer. In this context, the "first accelerometer" is the first accelerometer excited by surface waves during a test event, whereas the "second accelerometer" is the second accelerometer excited by surface waves during the event. The first maximum peak for the first accelerometer can be determined as the first positive peak having an amplitude that exceeds a predetermined threshold.

At step 1006, the first minimum peak for the first accelerometer can be determined as the last negative peak that precedes the first maximum peak and has an amplitude that exceeds a predetermined threshold.

The method can continue by identifying the first maximum and the first minimum peaks for the second accelerometer. This can be achieved by establishing a search window based on the maximum peaks identified for the first accelerometer at step 1004. For example, a window can be established, which is statistically likely to capture the first maximum peak for the second accelerometer, based on the spacing between the accelerometers (or rods in the system of FIG. 2) and the expected wave speed.

For example, the approximate (or expected) difference in pings between the first maximum peaks for the two accelerometers can be determined as:

$$EPS(\text{in pings}) = \left(\frac{\text{accleromater spacing}}{\text{expected wave speed}}\right) \times \left(\frac{1}{\text{time step}}\right) \quad (1)$$

where EPS is the expected peak separation (in pings) between the first maximum peaks for each accelerometer, accelerometer spacing is the distance measured between the accelerometers (or rods), expected wave speed is the expected speed of surface waves in concrete, and time step is the amount of time between each ping (measured in seconds). The expected wave speed can be estimated based on known properties of concrete. If the estimate is incorrect, it can be refined and the method repeated. This is explained in more detail below with respect to windowing. As one non-limiting example, if the distance between the accelerometers (or rods) is 18 inches, the expected surface wave speed is set to 7,500 ft/s, and the time step is $2 \times 10^{-6}$ seconds/ping, using equation (1) results in an expected peak separation of 100 pings. Thus, it is to be expected in this example that the first maximum peak for the second accelerometer will be approximately 100 pings after the first maximum peak for the first accelerometer.

Therefore, at step 1008, a window can be established to search for the first maximum peak for the second accelerometer. One way to establish the search window is by time shifting (i.e., earlier in time) the expected location of the first maximum peak for the second accelerometer. The purpose of time shifting is so that the search window begins before where the first maximum peak for the second accelerometer is statistically likely to occur. The time shift factor can be, for example, 0.1, 0.2, 0.3, 0.4, 0.5, 0.6, 0.7, 0.8, or 0.9, including any lesser, greater, or intermediate value (including values to three decimal places). The time shift factor is multiplied by the expected peak separation to reduce the distance measured from the first maximum peak for the first accelerometer. Therefore, the time shift factor must generally be less than 1 (otherwise, the shift factor will cause the search window to begin after where the first maximum peak for the second accelerometer is expected to occur).

Figure 11:
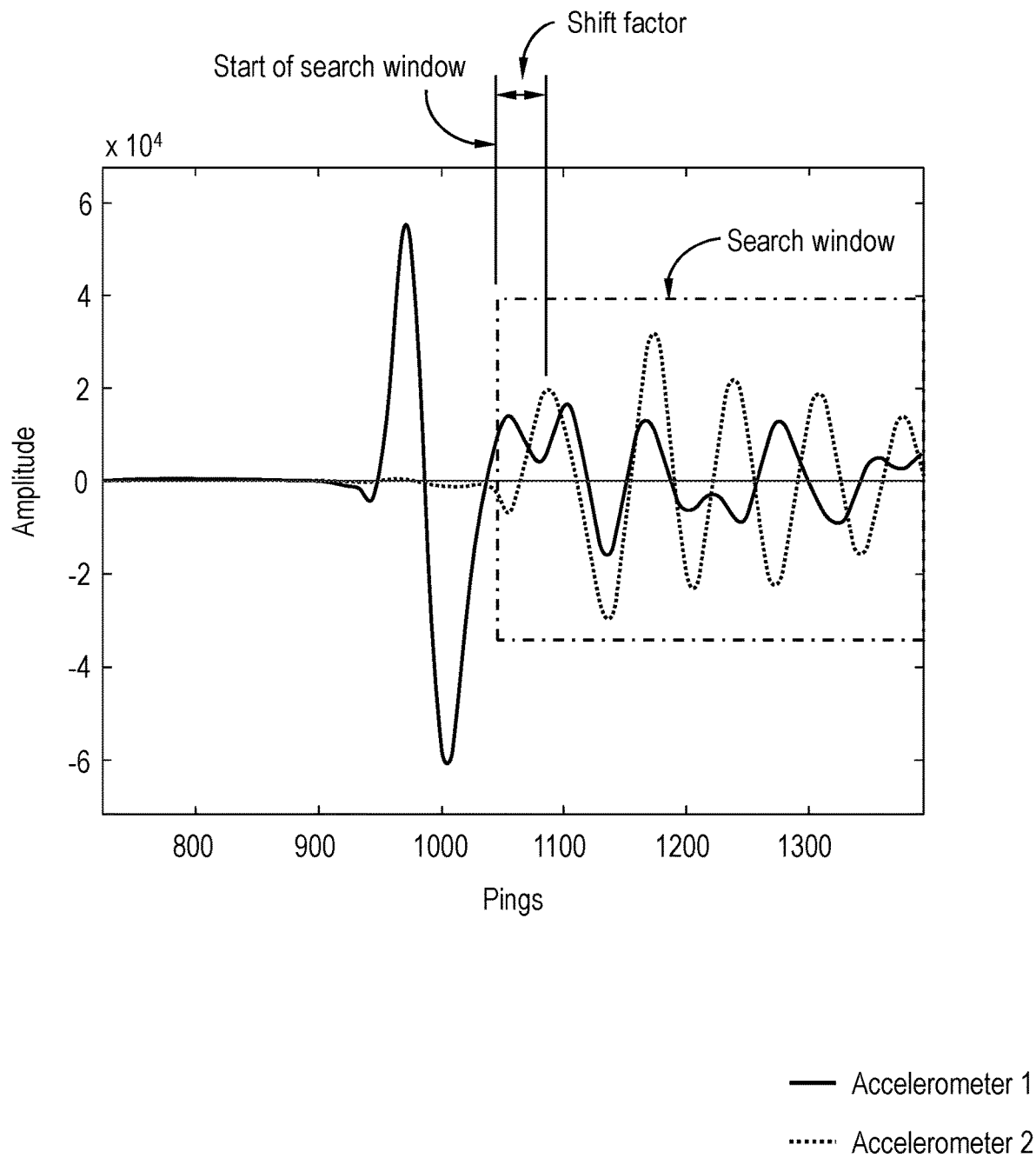
FIG. 11 is a graph diagram of the waveforms of FIG. 8 illustrating a search window.

In one non-limiting example, the time shift factor is 0.3 times the expected peak separation subtracted from the expected location of the first maximum peak for the second accelerometer. Continuing with the example above, suppose the first maximum peak for the first accelerometer occurs at 970 pings. Because the expected peak separation is 100 pings, the first maximum peak for the second accelerometer is expected to be at about 1070 pings. The search window can therefore begin at (1070 pings)−(100 pings×0.3), which is at 1040 pings. FIG. 11 is a graph diagram of the waveforms from FIG. 8 illustrating a search window that is based on the expected location of the first maximum peak for the second accelerometer minus a shift factor of 0.3 times the peak separation of 100 pings.

Another way to establish the search window is by time shifting (later in time) from the first maximum peak for the first accelerometer. For example, because the first maximum peak for the first accelerometer begins at 970 pings (in the example above), and the expected peak separation is 100 pings, the search window can be established based on (970 pings)+(100 pings×shift factor).

With the search window established at step 1008, the method can proceed to step 1010 by analyzing the data from the second accelerometer to identify a first maximum peak. The first maximum peak for the second accelerometer can be identified as the first positive peak within the window that has an amplitude greater than a predetermined threshold.

At step 1012, the first minimum peak for the second accelerometer can be identified as the last negative peak that precedes the first maximum peak for the second accelerometer and that has an amplitude exceeding a predetermined threshold.

At step 1014, the two wave speeds can be calculated. The max-to-max wave speed can be calculated as the distance measured between the accelerometers (or rods) divided by the time (in pings) between the two maximum peaks. Likewise, the min-to-min wave speed can be calculated as the distance measured between the accelerometers (or rods) divided by the time (in pings) between the two minimum peaks.

At step 1016, the calculated max-to-max and min-to-min wave speeds can be compared against an expected range for the wave speeds. If both calculated wave speeds are within the expected range, the wave speeds can be considered accurate at step 1018. The wave speeds can be saved at step 1030 for further processing in the next part of the algorithm.

However, if one or both calculated wave speeds fall outside of the expected range based on the comparison at step 1016, the wave speed calculations should be refined. For example, it is possible that the window was inaccurately established, meaning that the maximum peak for the second accelerometer was not, in fact, the first positive peak for the second accelerometer (also resulting in the minimum peak for the second accelerometer to be inaccurate).

To address this, the search window can be adjusted at step 1022 and the data re-analyzed to identify the first maximum peak for the second accelerometer. If either calculated wave speed was less than the expected range, the search window can be adjusted so that it begins earlier in time. If either calculated wave speed was greater than the expected range, the search window can be adjusted so that it begins later in time. In some embodiments, the search window is redefined by doubling the time shift factor. In other embodiments, the search window is redefined by decreasing or increasing the time shift factor by a percentage. With a new search window defined, the data can be analyzed again at step 1010 and the method repeated.

The search window can be redefined any number of times. However, an upper limit can be placed on the number of times the search window is redefined to prevent an infinite loop from occurring. In some embodiments, the search window is redefined only once. If accurate wave speeds cannot be determined after the window has been adjusted the maximum number of times, at step 1024, the data is considered bad data and not usable or suitable for the overall analysis. The GUI can inform the user that the data is not usable or suitable and can prompt the user to begin another test event (step 1026). Thereafter, the method can restart at step 1002. The data deemed not usable at step 1024 can be saved for later analysis or can be discarded.

The method of FIG. 10 is only one example of how to calculate wave speeds from accelerometer data resulting from a test event. Several variations to the method of FIG. 10 are possible. For example, the search window can be based on the first minimum peak for the first accelerometer instead of the first maximum peak. As another example, the search window can began at or near the first maximum peak or the first minimum peak for the first accelerometer and incremented by a set amount until the first maximum peak for the second accelerometer is found. As yet another example, once the first maximum peak for the second accelerometer is found, the max-to-max wave speed can be calculated and compared against an expected range. If the calculated wave speed falls outside of the expected range, the search window can be redefined. If the calculated wave speed falls within the expected range, the min-to-min wave speed can be calculated and compared against the expected range. If the calculated min-to-min wave speed is within the range, then both calculated wave speeds are accurate, whereas if the min-to-min wave speed is outside of the range, the search window can be adjusted.

At the conclusion of the method of FIG. 10, either the calculated max-to-max and min-to-min wave speeds will have been determined accurately enough for the next part of the algorithm or the data will have produced inaccurate wave speeds. Ideally, the next part of the algorithm will analyze several data sets of wave speeds. Generally, the more wave speeds that are calculated the more accurate the calculation of surface wave speeds may be, which will result in more accurately estimating compressive strength based on the surface wave speeds. For example, 1, 2, 3, 4, 5, 10, 15, 20, or 30 data sets of surface wave speeds can be collected, including any greater, lesser, or intermediate number of data sets. In some embodiments, at least 20 data sets of max-to-max and min-to-min wave speeds are collected for the overall processing.

(3) Overall Analysis of the Data Sets

This part of the post-processing algorithm seeks to determine an average max-to-max and/or an average min-to-min surface wave speed from the collected data sets. Generally, data that is outside of an expected or acceptable range is culled while the remaining data is used to calculate the average wave speed(s). This can be achieved in different ways.

Figure 12:
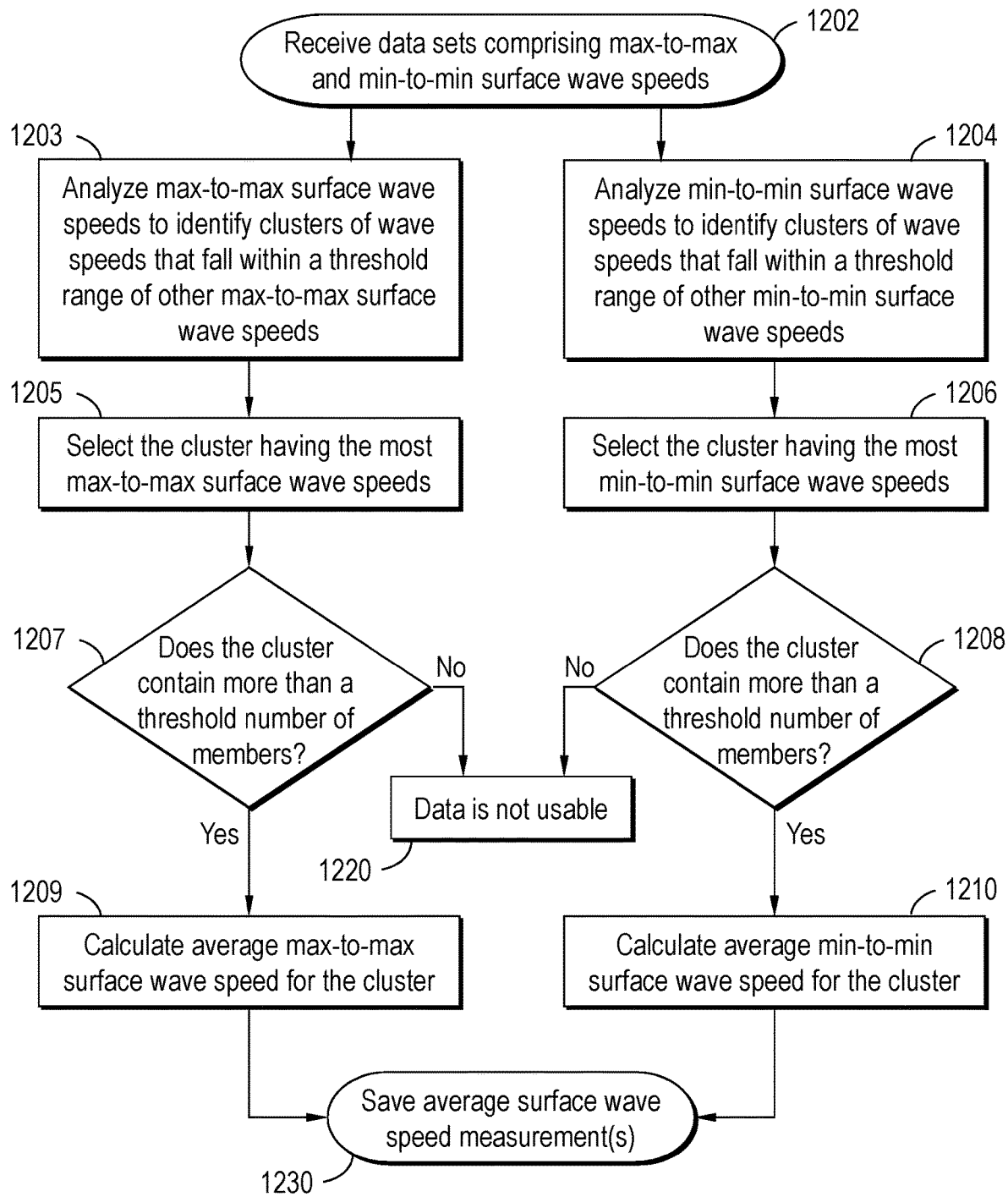
FIG. 12 is a flow diagram illustrating an example method for determining an average max-to-max and/or an average min-to-min surface wave speed.

FIG. 12 is a flow diagram illustrating an example method for determining an average max-to-max and/or an average min-to-min surface wave speed from collected data sets comprising calculated surface wave speeds. The method refers to the systems illustrated in FIGS. 1-5. In other examples, additional or alternative systems or components may be used to perform the method of FIG. 12.

The method begins at step 1202 by receiving data sets comprising max-to-max and min-to-min surface wave speeds calculated from individual test events. Preferably, the data sets will have been validated using the methods of FIG. 7 and/or FIG. 10. The max-to-max surface wave speeds can be analyzed as one group while the min-to-min surface wave speeds can be analyzed as a separate group. Alternatively, the max-to-max and min-to-min wave speeds can be combined and analyzed together as one group. One benefit of analyzing the max-to-max and min-to-min wave speeds separately, however, is that the independent analyses can be used as a quality check that can add confidence to the calculations that might not otherwise be available when all wave speeds are considered as one group. For example, if the wave speeds are analyzed separately and shown to agree, it can be inferred that each average wave speed (i.e., max-to-max and min-to-min) is an accurate calculation of the actual wave speed, whereas if the separately-calculated wave speeds differ by some threshold amount, it can be inferred that one or both calculations of average wave speeds may be inaccurate. For purposes of illustrating aspects of the invention, the method of FIG. 12 is explained in the context of considering the max-to-max and min-to-min surface wave speeds separately.

At steps 1203 and 1204, the group of max-to-max surface wave speeds and the group of min-to-min surface wave speeds are each analyzed to identify clusters of wave speeds that fall within a threshold range from the other wave speeds within that group. For example, the threshold range can be defined as the difference between the lowest and highest speed of a group. Using step 1203 as an example, the max-to-max surface wave speeds can be arranged in ascending order to make the analysis more efficient. Suppose that the threshold range has been set to 300 ft/s. In practice, the threshold range can be any measure of speed, including 10 ft/s, 20 ft/s, 30 ft/s, 40 ft/s, 50 ft/s, 100 ft/s, 200 ft/s, 300 ft/s, 400 ft/s, 500 ft/s, 1000 ft/s, including any greater, lesser, or intermediate value (including values in less than 10 ft/s increments, such as 306 ft/s, 243 ft/s, and so on.) One consideration for setting the threshold range can be the tolerance of the hardware used, such as the tolerance (e.g., potential error) of the accelerometers.

Beginning with the first (lowest) max-to-max wave speed, any other max-to-max surface wave speed that is within 300 ft/s of the first max-to-max wave speed can be considered part of the first cluster. Then, the second lowest max-to-max wave speed can be considered. Any max-to-max wave speed that is within 300 ft/s of the second max-to-max wave speed can be considered part of the second cluster. Then, the third lowest max-to-max wave speed can be considered. Any max-to-max wave speed that is within 300 ft/s of the third max-to-max wave speed can be considered part of the third cluster, and so on until each of the max-to-max wave speeds have been considered and other max-to-max wave speeds have been identified as part of the applicable clusters. At step 1204, this process can be repeated for the min-to-min wave speeds. At the conclusion of these steps, the max-to-max wave speeds and the min-to-min wave speeds each will have been considered and each will have been identified as part of one or more clusters.

At steps 1205 and 1206, the cluster having the most max-to-max surface wave speed calculations and the cluster having the most min-to-min surface wave speeds can be selected. In the event that two or more clusters have the same number of wave speeds as members, the tie can be resolved by selecting the cluster having the lowest average wave speed, for example.

At steps 1207 and 1208, the two selected clusters can each be analyzed to determine whether they contain a threshold number of surface wave speeds. For example, the threshold can be 2, 3, 4, 5, 6, 7, 8, 9, 10, 15, 20, 30, 40, or 50 surface wave speed measurements, including any lesser, greater, or intermediate number of measurements. The threshold selected may depend on the number of collected data sets. For example, in some embodiments, 20 data sets are collected (each comprising a max-to-max and min-to-min surface wave speed measurement) and the threshold is set to at least 6 members in the cluster. The threshold can also be based on a certain minimum percentage of all the wave speeds in that group. For example, the threshold can be set to 10%, 20%, 30%, 40%, 50% or any greater, lesser, or intermediate number of all the surface wave speed measurements for that group. For example, if a data set comprises 60 surface wave speed measurements and the threshold is set to 25%, then a cluster must have at least 15 members to be considered.

If either of the selected clusters having the most surface wave speed measurements from steps 1205 and 1206 contain less than the threshold number of members, the data may be deemed not usable or suitable to calculate an average surface wave speed (step 1220). For example, if the largest cluster of max-to-max surface wave speeds contains five wave speed measurements and the minimum threshold is set to six, the max-to-max surface wave speeds may be deemed unusable. Similarly, if the largest cluster of min-to-min surface wave speeds contains less than the threshold number of members, the min-to-min surface wave speeds may be deemed unusable. If both clusters are unusable, new data sets can be collected and the algorithm can be repeated.

If either cluster contains more surface wave speeds than the threshold number, at steps 1209 and 1210, the average surface wave speed for that cluster can be calculated and saved (step 1230).

Estimating Compressive Strength.

The average surface wave speed(s) calculated can be used to estimate the compressive strength of the concrete. For example, the inventors have found empirically that the compressive strength of concrete can be estimated using a fourth order polynomial, at least within the range of expected surface wave speeds for concrete, having the form:

$$y = Ax^4 + Bx^3 + Cx^2 + Dx + k \quad (2)$$

where y is the compressive strength of concrete measured in pounds per square inch (PSI), A, B, C, D, and k are constants, and x is the average surface wave speed(s) calculated and measured in feet per second (ft/s).

The constants can be determined, for example, by applying regression analysis to measurements of compressive strength and surface wave speed for a plurality of concrete specimens. For example, the compressive strength of the specimens can be determined using other methods, such as core-sampling. The speed of surface waves in these specimens can be determined using the disclosed systems and methods. Regression analysis can be applied to the collected data to determine the constants A, B, C, D, and k in equation (2). Then, the average surface wave speed(s) calculated for a concrete structure (that is not one of the specimens) can be substituted for x in equation (2) to determine an estimate of the compressive strength of that concrete structure. If the data resulted in two average wave speeds, i.e., one max-to-max wave speed and one min-to-min wave speed, those two wave speeds can be averaged, and the average can be substituted for x in equation (2) to determine an estimate of the compressive strength of that concrete structure.

Figure 13:
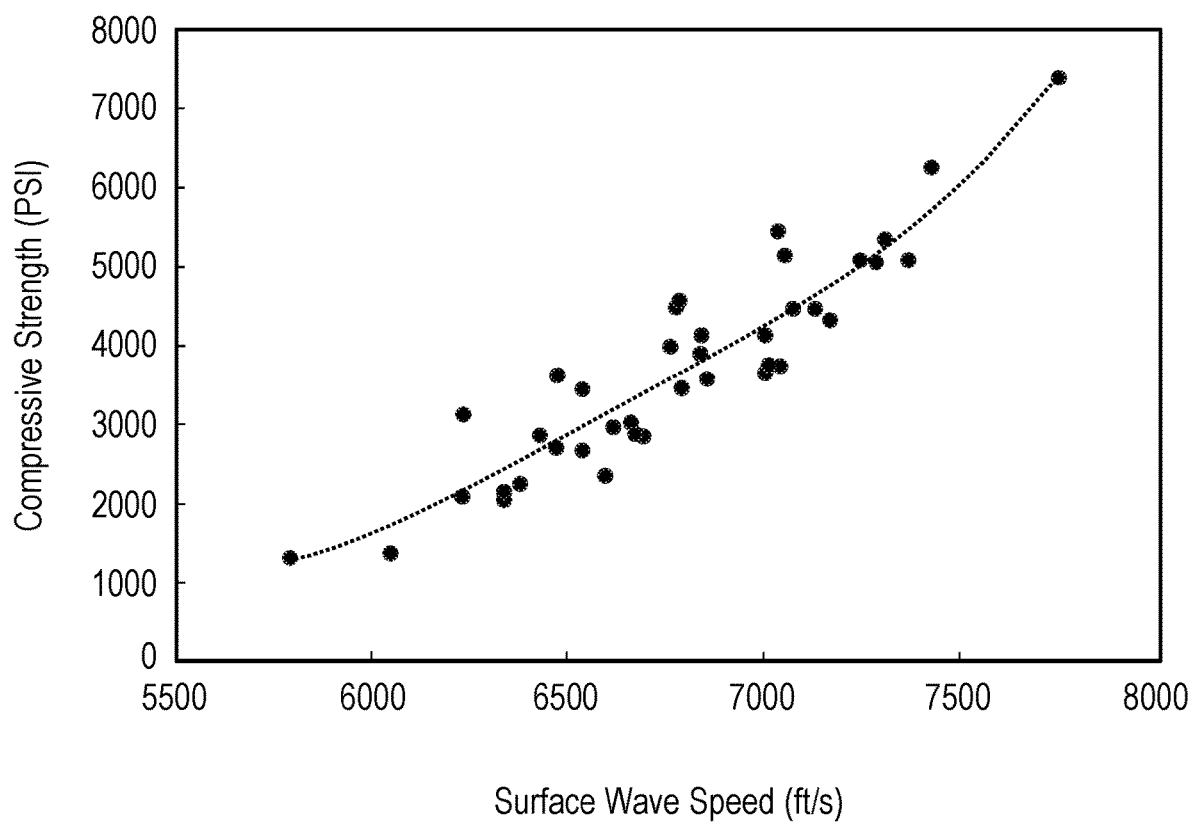
FIG. 13 is a graph diagram illustrating an example regression model expressing compressive strength as a function of surface wave speed for a plurality of concrete specimens.

FIG. 13 is a graph diagram illustrating an example regression model that expresses compressive strength as a function of surface wave speed for a plurality of concrete specimens. In this example, the constants A, B, C, D, and k were determined as:

$$A=7\times10^{-10}$$

$$B=-2\times10^{-5}$$

$$C=0.194$$

$$D=-853.74$$

$$k=1\times10^{6}$$

The regression model of FIG. 13 and the values for the constants A, B, C, D, and k are only examples. The values of the constants may (and will likely) change based on additional or different compressive strength and/or surface wave speed measurements. Moreover, the fourth order polynomial of equation (2) is only one example of regression modeling to estimate compressive strength. Other regression analyses can be applied and different polynomials may be developed to model compressive strength as a function of surface wave speed measurements.

Figure 14:
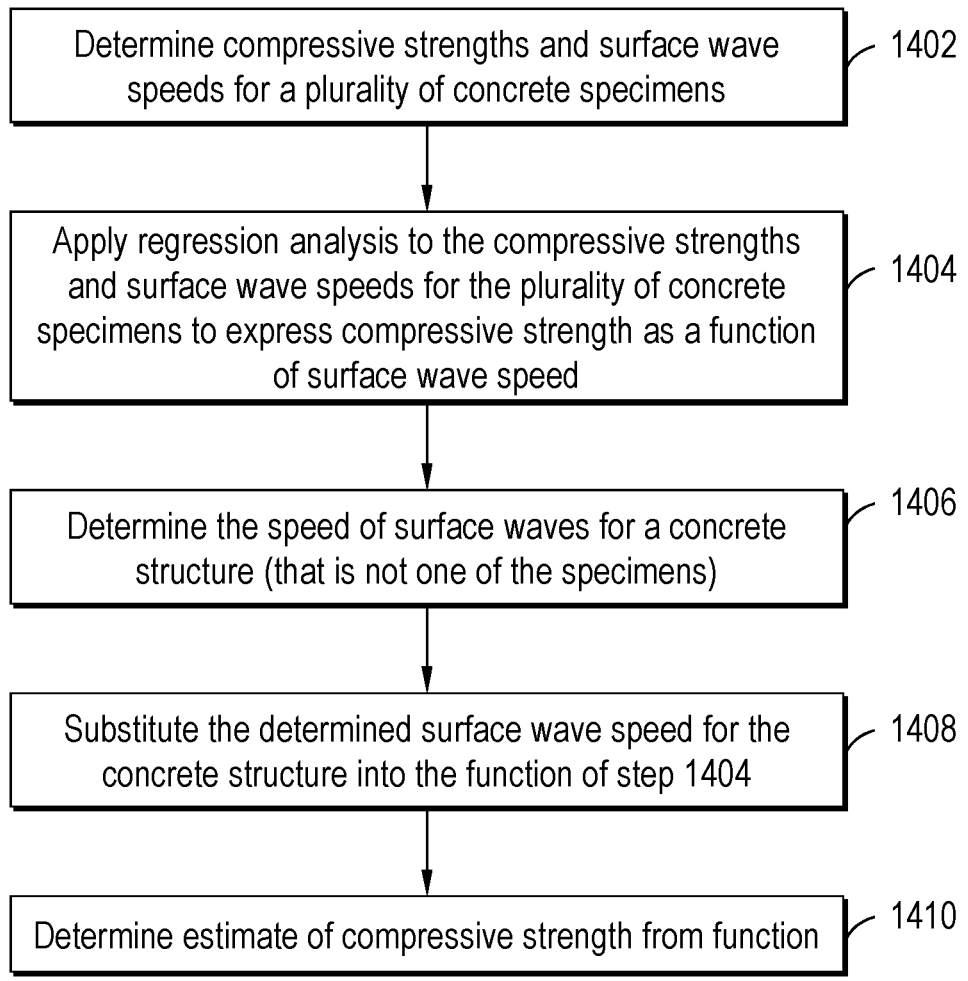
FIG. 14 is a flow diagram illustrating an example of a general method for estimating compressive strength of concrete using surface wave speed measurements.

For example, FIG. 14 is a flow diagram illustrating an example of a general method for estimating compressive strength of concrete using surface wave speed measurements. The method refers to the systems illustrated in FIGS. 1-5. In other examples, additional or alternative systems, methods, or components may be used to perform the method of FIG. 14.

The method begins at step 1402 by determining the compressive strengths and speed of surface waves for a plurality of concrete specimens. At step 1404, regression analysis can be applied to the compressive strengths and surface wave speeds determined at step 1402 to express compressive strength as a function of surface wave speed. At step 1406, the speed of surface waves for a concrete structure, which is not one of the concrete specimens, can be determined. At step 1408, the surface wave speed for the concrete structure can be substituted into the function developed at step 1404. At step 1410, the compressive strength of the concrete can be estimated based on the function and surface wave speed.

Figure 15:
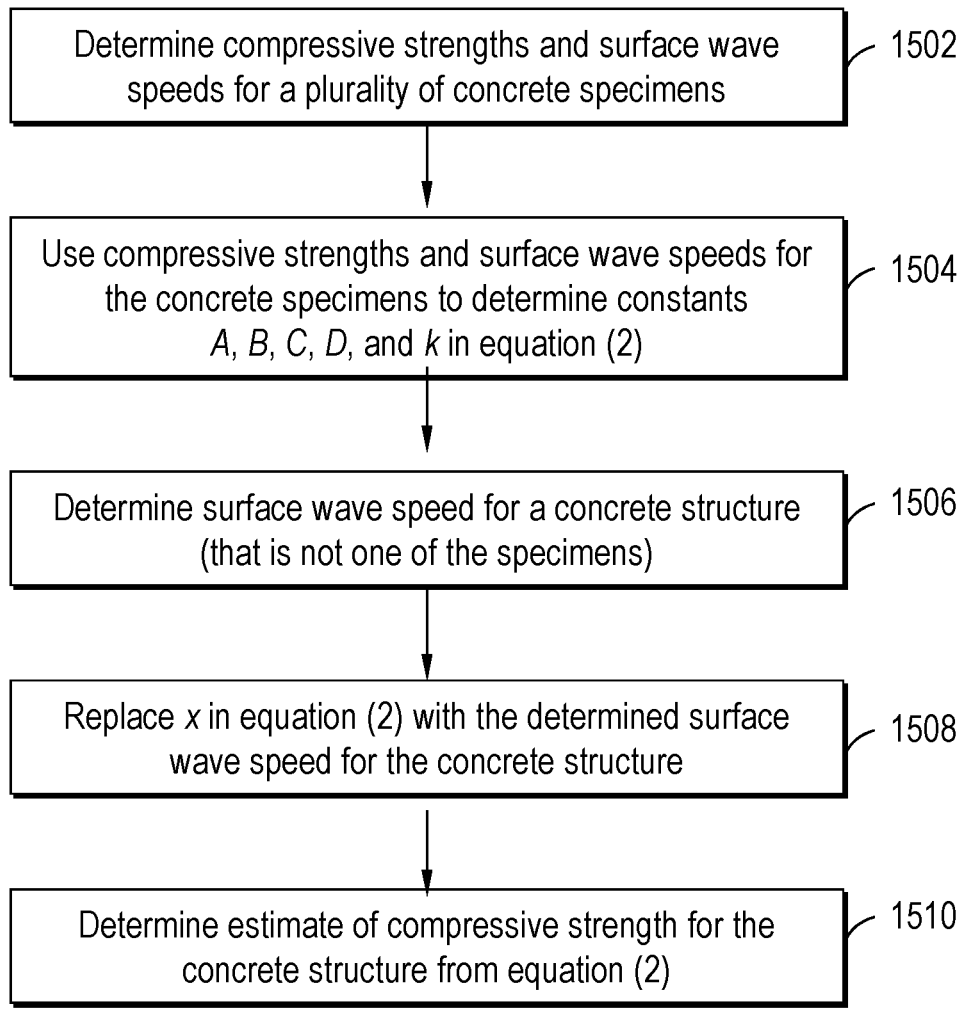
FIG. 15 is a flow diagram illustrating an example method for estimating compressive strength of concrete.

FIG. 15 is a flow diagram illustrating an example method for estimating compressive strength of concrete using equation (2). The method refers to the systems illustrated in FIGS. 1-5. In other examples, additional or alternative systems, methods, or components may be used to perform the method of FIG. 15.

Beginning at step 1502, the compressive strengths and speed of surface waves for a plurality of concrete specimens can be determined. At step 1504, the compressive strengths and surface wave speed measurements can be used to determine the constants A, B, C, D, and k in equation (2). At step 1506, the speed of surface waves for a concrete structure, which is not one of the concrete specimens, can be determined. For example, the systems of FIGS. 1-5 and/or the methods of FIGS. 7, 10 and 12 can be used to determine the speed of surface waves in the concrete. At step 1508, the surface wave speed for the concrete structure can be substituted into equation (2) by replacing x. At step 1510, the compressive strength of the concrete structure can be estimated using equation (2).

In some embodiments, machine learning can be used to model compressive strength as a function of surface wave speed and to estimate compressive strength for a concrete structure. The compressive strength can be estimated, for example, using an All-in-One (AIO) prediction model, which can comprise a variety of linear, non-linear, and ensemble regression machine learning models.

Figure 16:
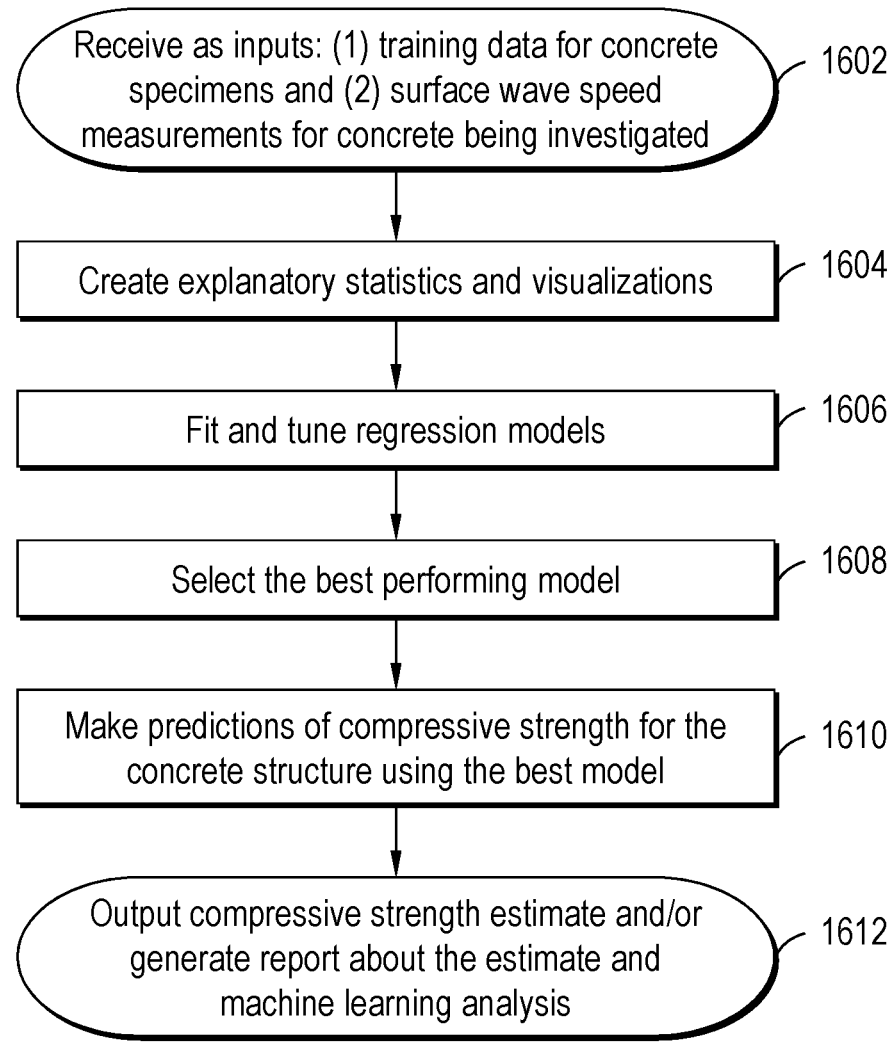
FIG. 16 is a flow diagram illustrating an example method for using machine learning models to estimate compressive strength of concrete.

FIG. 16 is a flow diagram illustrating an example method for using machine learning models to estimate compressive strength. The example method refers to the systems of FIGS. 1-5. In other examples, additional or alternative systems and components may be used to perform the method of FIG. 16.

The method can begin at step 1602 by receiving (1) training data for concrete specimens and (2) surface wave speed measurements for a concrete structure under investigation. The training data can comprise compressive strength measurements and surface wave speed measurements performed on the specimens to help derive a relationship between compressive strength and surface wave speed. The compressive strength of the specimens can be determined using, for example, core-sampling, while the surface wave speeds can be determined using the disclosed systems and methods. Additional parameters can be included in the training data, such as whether the specimens were above- or below-grade. Surface wave speeds for the concrete structure under investigation can also be determined using the disclosed systems and methods.

At step 1604, explanatory statistics and visualizations can be created. For example, explanatory statistics for the mean, standard deviation, min, max, 25%, 50%, and 75% percentiles can be created. Visualizations such as a correlation matrix heat map or a "pairplot," which shows the pairwise relationships of the variables in the data set, can be created.

At step 1606, several regression models can be fitted to the training data and their hyperparameters tuned using algorithms. The algorithms can include, for example GridSearchCV and RandomizedSearchCV. A non-limiting list of example regression models, which include linear, non-linear, and ensemble models, that can be trained and tuned include: DummyRegressor, LinearRegression, Ridge, Lasso, SGDRegressor, KernelRidge, LinearSVR, SVR, KNeighborsRegressor, DecisionTreeRegressor, ExtraTreesRegressor, RandomForestRegressor, GradientBoostingRegressor, XGBRegressor, MLPRegressor, KerasRegressor, and StackingRegressor.

At step 1608, the best performing model from step 1606 can be selected. This can be determined by evaluating the model performance on the unseen data (e.g., compressive strength estimates for the concrete structure). For example, the K-Fold cross validation (CV) Mean Absolute Error (MAE) can be utilized, where K can be selected as 5. Thus, the 5-Fold MAE scores for the models from step 1606 can be analyzed and the model having the lowest MAE score can be selected.

At step 1610, the best performing regression model selected at step 1608 can be used to estimate the compressive strength of the concrete structure under investigation.

At step 1612, an output can be generated indicating the compressive strength prediction for the concrete structure under investigation along with information about the machine learning analysis. For example, a report can be generated comprising descriptive statistics for each variable in the training data, the performance scores for each of the regression models considered, and the compressive strength predictions for the concrete structure. If the machine learning algorithm is executed on computing device 170, the user can receive the compressive strength estimates in real-time. The machine learning algorithm can also be executed on remote system 190 to provide real-time predictions and/or the predictions at a later time.

While the disclosed systems and methods have been explained in terms of measuring the speed of surface waves in concrete, it is contemplated that these systems and methods can be applied to other dispersive media.

Although the disclosed systems and methods have been explained in the context of using accelerometers to measure the speed of surface waves, any type of sensor and instrumentation can be used as long as the sensors and instrumentation can capture time information of a dispersive wave. For example, instead of accelerometers, displacement sensors or velocity sensors can be used. Additional circuitry and processing components can be used to convert data received from these other types of sensors into acceleration data, if necessary or desired. For example, velocity data can be integrated to provide acceleration data, and displacement data can be integrated twice to provide acceleration data.

While particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law. Further, the sequence of steps for the example methods described or illustrated herein are not to be construed as necessarily requiring their performance in the particular order described or illustrated unless specifically identified as requiring so or clearly identified through context. Moreover, the example methods may omit one or more steps described or illustrated, or may include additional steps in addition to those described or illustrated. Thus, one of ordinary skill in the art, using the disclosures provided herein, will appreciate that various steps of the example methods can be omitted, rearranged, combined, and/or adapted in various ways without departing from the spirit and scope of the inventions.

What is claimed is:

1. A method for estimating compressive strength of a concrete foundation, the method comprising:
   determining compressive strength measurements corresponding to surface wave speeds for a plurality of concrete test specimens;
   determining a speed of surface waves in the concrete foundation based on a plurality of peak-to-peak wave speeds, wherein the plurality of peak-to-peak waves speeds is based on sensor data received from a first accelerometer and sensor data received from a second accelerometer, wherein the first accelerometer and the second accelerometer are positioned in a spaced relationship relative to each other and the concrete foundation, wherein the sensor data results from a plurality of test events, wherein each test event comprises surface waves on the concrete foundation triggering the first and second accelerometers; and
   estimating compressive strength of the concrete foundation based on the compressive strength measurements and corresponding surface wave speeds for the plurality of concrete test specimens and the speed of surface waves in the concrete foundation.

2. The method of claim 1, wherein the sensor data from the first accelerometer and the sensor data from the second accelerometer are subjected to one or more quality checks.

3. The method of claim 2, wherein the one or more quality checks comprises determining that an amplitude in the sensor data does not exceed a predetermined threshold.

4. The method of claim 2, wherein the one or more quality checks comprises determining that amplitudes in the sensor data do not fluctuate less than a predetermined threshold.

5. The method of claim 2, wherein the one or more quality checks comprises determining that the sensor data does not contain amplitude fluctuations greater than a predetermined threshold for a period of time preceding the arrival of surface waves at the accelerometers.

6. The method of claim 2, wherein the one or more quality checks comprises determining that the sensor data does not contain amplitude fluctuations greater than a predetermined threshold for a period of time after the fluctuations associated with the surface waves.

7. The method of claim 1, wherein determining a speed of surface waves in the concrete foundation comprises:
   receiving sensor data from a first accelerometer and sensor data from a second accelerometer, wherein the first accelerometer and the second accelerometer are in a spaced relationship relative to each other and the concrete foundation, wherein the sensor data results from surface waves on the concrete foundation triggering the first and second accelerometers;
   from the sensor data received from the first accelerometer, determining a first accelerometer maximum peak and a first accelerometer minimum peak;
   from the sensor data received from the second accelerometer, determining a second accelerometer maximum peak and a second accelerometer minimum peak;
   determining a max-to-max wave speed based on the first accelerometer maximum peak and the second accelerometer maximum peak;
   determining a min-to-min wave speed based on the first accelerometer minimum peak and the second accelerometer minimum peak; and
   determining the speed of surface waves in the concrete foundation based on the max-to-max wave speed and the min-to-min wave speed.

8. The method of claim 7, wherein determining the speed of surface waves in the concrete foundation based on the max-to-max wave speed and the min-to-min wave speed comprises:
   determining that the max-to-max wave speed is within an expected range of surface wave speeds in the concrete foundation;
   determining that the min-to-min wave speed is within an expected range of surface wave speeds in the concrete foundation; and
   averaging the max-to-max wave speed and the min-to-min wave speed.

9. The method of claim 1, wherein determining a speed of surface waves in the concrete foundation comprises:
- receiving sensor data from a first accelerometer and sensor data from a second accelerometer, wherein the first accelerometer and the second accelerometer are in a spaced relationship relative to each other and the concrete foundation, wherein the sensor data results from a plurality of test events, wherein each test event comprises surface waves on the concrete foundation triggering the first and second accelerometers;
- from the sensor data, determining a plurality of max-to-max wave speeds and a plurality of min-to-min wave speeds;
- calculating an average max-to-max wave speed based on the plurality of max-to-max wave speeds;
- calculating an average min-to-min wave speed based on the plurality of min-to-min wave speeds; and
- calculating an average of the average max-to-max wave speed and the average min-to-min wave speed.

10. The method of claim 9, wherein calculating an average max-to-max wave speed based on the plurality of max-to-max wave speeds comprises:
- identifying clusters of max-to-max wave speeds from the plurality of max-to-max wave speeds that fall within a threshold range of other max-to-max wave speeds;
- selecting the cluster having the most max-to-max wave speeds;
- determining that the selected cluster contains more than a threshold number of max-to-max wave speeds; and
- averaging the max-to-max wave speeds for the selected cluster.

11. The method of claim 9, wherein calculating an average min-to-min wave speed based on the plurality of min-to-min wave speeds comprises:
- identifying clusters of min-to-min wave speeds from the plurality of min-to-min wave speeds that fall within a threshold range of other min-to-min wave speeds;
- selecting the cluster having the most min-to-min wave speeds;
- determining that the selected cluster contains more than a threshold number of min-to-min wave speeds; and
- averaging the min-to-min wave speeds for the selected cluster.

12. The method of claim 1 further comprising using machine learning to estimate compressive strength of the concrete foundation,
- wherein the machine learning receives, as training data, the compressive strength measurements and corresponding surface wave speeds for the plurality of concrete test specimens, and
- wherein the machine learning further receives, as input, the speed of surface waves in the concrete foundation.

13. The method of claim 12, wherein using machine learning comprises fitting one or more regression models to the training data and one or more hyperparameters associated with the training data.

14. The method of claim 13, wherein the one or more regression models includes one or more linear, non-linear, or ensemble models.

15. The method of claim 12, wherein using machine learning comprises:
- fitting a plurality of regression models to the training data and one or more hyperparameters associated with the training data; and
- selecting the regression model having the lowest mean absolute error.

16. The method of claim 15, wherein the selected regression model is used to estimate compressive strength of the concrete foundation.

17. A method for estimating compressive strength of a concrete foundation, the method comprising:
- correlating compressive strength measurements for a plurality of concrete test specimens with surface wave speeds in the concrete test specimens;
- applying regression analysis to the compressive strength measurements and surface wave speeds for the plurality of concrete specimens to express compressive strength as a function of surface wave speed;
- determining a speed of surface waves for the concrete foundation based on a plurality of peak-to-peak wave speeds, wherein the plurality of peak-to-peak waves speeds is based on sensor data received from a first accelerometer and sensor data received from a second accelerometer, wherein the first accelerometer and the second accelerometer are positioned in a spaced relationship relative to each other and the concrete foundation, wherein the sensor data results from a plurality of test events, wherein each test event comprises surface waves on the concrete foundation triggering the first and second accelerometers; and
- determining an estimate of compressive strength of the concrete foundation by substituting the determined speed of surface waves for the concrete foundation into the function.

18. The method of claim 17, wherein the function is a fourth order polynomial having the form of $y=Ax^4+Bx^3+Cx^2+Dx+k$, where y is compressive strength, A, B, C, D, and k are constants, and x is surface wave speed.

19. The method of claim 1, wherein determining a speed of surface waves in the concrete foundation based on a plurality of peak-to-peak wave speeds further comprises calculating an average peak-to-peak wave speed.

20. The method of claim 19, wherein calculating an average peak-to-peak wave speed comprises:
- identifying clusters of peak-to-peak wave speeds from the plurality of peak-to-peak wave speeds that fall within a threshold range of other peak-to-peak wave speeds;
- selecting the cluster having the most peak-to-peak wave speeds; and
- averaging the peak-to-peak wave speeds for the selected cluster.

21. The method of claim 20, wherein:
- the plurality of peak-to-peak wave speeds comprises a plurality of max-to-max wave speeds, the clusters of peak-to-peak wave speeds comprises clusters of max-to-max waves speeds, and the average peak-to-peak wave speed comprises an average max-to-max wave speed.

22. The method of claim 20, wherein:
- the plurality of peak-to-peak wave speeds comprises a plurality of min-to-min wave speeds, the clusters of peak-to-peak wave speeds comprises clusters of min-to-min waves speeds, and the average peak-to-peak wave speed comprises an average min-to-min wave speed.

23. The method of claim 17, wherein determining a speed of surface waves in the concrete foundation based on a plurality of peak-to-peak wave speeds further comprises calculating an average peak-to-peak wave speed.

24. The method of claim 23, wherein calculating an average peak-to-peak wave speed comprises:
- identifying clusters of peak-to-peak wave speeds from the plurality of peak-to-peak wave speeds that fall within a threshold range of other peak-to-peak wave speeds;
- selecting the cluster having the most peak-to-peak wave speeds; and
- averaging the peak-to-peak wave speeds for the selected cluster.

25. The method of claim 24, wherein:
- the plurality of peak-to-peak wave speeds comprises a plurality of max-to-max wave speeds, the clusters of peak-to-peak wave speeds comprises clusters of max-to-max waves speeds, and the average peak-to-peak wave speed comprises an average max-to-max wave speed.

26. The method of claim 25, wherein:
- the plurality of peak-to-peak wave speeds comprises a plurality of min-to-min wave speeds, the clusters of peak-to-peak wave speeds comprises clusters of min-to-min waves speeds, and the average peak-to-peak wave speed comprises an average min-to-min wave speed.

* * * * *